US007465228B2

(12) United States Patent
Okada

(10) Patent No.: US 7,465,228 B2
(45) Date of Patent: Dec. 16, 2008

(54) GAMING MACHINE HAVING A STOP ORDER ASSOCIATED WITH A PRIZE-WINNING COMBINATION

(75) Inventor: Kazuo Okada, Tokyo (JP)

(73) Assignee: Aruze Corp., Tokyo (JP)

( * ) Notice: Subject to any disclaimer, the term of this patent is extended or adjusted under 35 U.S.C. 154(b) by 397 days.

(21) Appl. No.: 10/697,256

(22) Filed: Oct. 31, 2003

(65) Prior Publication Data

US 2004/0219965 A1 Nov. 4, 2004

(51) Int. Cl.
*G06F 17/00* (2006.01)
*G06F 19/00* (2006.01)

(52) U.S. Cl. ............................ 463/20; 463/16; 463/30; 463/31; 273/138.1

(58) Field of Classification Search .................. 463/16, 463/20, 30, 31; 273/138.1
See application file for complete search history.

(56) References Cited

U.S. PATENT DOCUMENTS 4,573,681 A 3/1986 Okada
6,517,433 B2 2/2003 Loose et al.
6,817,946 B2 * 11/2004 Motegi et al. ................ 463/31
2001/0031658 A1 * 10/2001 Ozaki et al. .................. 463/16
2002/0175466 A1 11/2002 Loose et al.
2003/0087690 A1 * 5/2003 Loose et al. ................. 463/20
2004/0029636 A1 * 2/2004 Wells ......................... 463/32
2005/0192090 A1 * 9/2005 Muir et al. ................... 463/30

FOREIGN PATENT DOCUMENTS

EP 1260928 A 11/2002
EP 1391856 A 2/2004
JP 3-72313 B2 11/1991
JP 04-220276 A 8/1992
JP 09253271 A * 9/1997
JP 2000-135306 A 5/2000
JP 2000-300729 A 10/2000
JP 2000300729 A * 10/2000
JP 2001-079200 A 3/2001
JP 3077924 U 3/2001
JP 2001062032 A * 3/2001
JP 2001-252394 A 9/2001
JP 2001238995 A * 9/2001
JP 2001-346969 A 12/2001

(Continued)

OTHER PUBLICATIONS

Translation of JP 2000-300729 A. Machine English translation of abstract, detailed description, and claims.*
Translation of JP 2001-062032 A. Machine English translation of abstract, detailed description, and claims.*
Translation of JP 2001-238995 A. Machine English translation of abstract, detailed description, and claims.*

(Continued)

*Primary Examiner*—Robert Pezzuto
*Assistant Examiner*—Milap Shah
(74) *Attorney, Agent, or Firm*—Rader, Fishman & Grauer PLLC

(57) ABSTRACT

An effect display panel, in which a transparent liquid crystal panel for image effect and a liquid crystal film for an electronic shutter are laminated, is disposed in front of main reels. With an electronic shutter, shielding regions can be set by software. During ST gaming, control is executed so that reels, which should be subject to stop control, are indicated. Specifically, a display region of the reel to be stopped is controlled in a transmissive state and display regions of other reels are controlled in a shielding state.

9 Claims, 32 Drawing Sheets

| table No. | left center right | left right center | center left right | center right left | right left center | right center left |
|---|---|---|---|---|---|---|
| 1 | O | × | × | × | × | × |
| 2 | × | O | × | × | × | × |
| 3 | × | × | O | × | × | × |
| 4 | × | × | × | O | × | × |
| 5 | × | × | × | × | O | × |
| 6 | × | × | × | × | × | O |

O··· prize won
×··· prize not won
* correct observation push timing not required

FOREIGN PATENT DOCUMENTS

| | | | |
|---|---|---|---|
| JP | 2002-078847 | A | 3/2002 |
| JP | 2002-17745 | A | 6/2002 |
| JP | 2002-172205 | A | 6/2002 |
| JP | 2002-177450 | A | 6/2002 |
| JP | 2002-177504 | A | 6/2002 |
| JP | 2002-200219 | A | 7/2002 |
| JP | 2002-210124 | A | 7/2002 |
| JP | 2003-190637 | A | 7/2003 |
| WO | WO-03/039699 | A | 5/2003 |

OTHER PUBLICATIONS

Machined English translation of JP 09253271 A. Including abstract, a detailed description, and claims.*

European Search Report.

PRCIPO Notification of First Office Action ( and English translation), App. No. 200410032663.8, Apr. 6, 2007 (8 pages).

JPO Decision on Appeal Trial, App. No. 2002-240705, Trans. No. 020609, Trans. Date: Apr. 8, 2008 (9 pages).

* cited by examiner

Fig. 8 A

| | left reel |
|---|---|
| 21 | red 7 |
| 20 | cherry |
| 19 | bell |
| 18 | replay |
| 17 | red 7 |
| 16 | BAR |
| 15 | replay |
| 14 | bell |
| 13 | sword 7 |
| 12 | cherry |
| 11 | bell |
| 10 | replay |
| 9 | BAR |
| 8 | sword 7 |
| 7 | bell |
| 6 | replay |
| 5 | sword 7 |
| 4 | watermelon |
| 3 | bell |
| 2 | replay |
| 1 | sword 7 |

40L'

Fig. 8 B

| | center reel |
|---|---|
| 21 | red 7 |
| 20 | replay |
| 19 | watermelon |
| 18 | sword 7 |
| 17 | bell |
| 16 | sword 7 |
| 15 | replay |
| 14 | cherry |
| 13 | bell |
| 12 | sword 7 |
| 11 | replay |
| 10 | watermelon |
| 9 | BAR |
| 8 | bell |
| 7 | red 7 |
| 6 | replay |
| 5 | bell |
| 4 | replay |
| 3 | BAR |
| 2 | sword 7 |
| 1 | bell |

40C'

Fig. 8 C

| | right reel |
|---|---|
| 21 | cherry |
| 20 | bell |
| 19 | replay |
| 18 | sword 7 |
| 17 | watermelon |
| 16 | bell |
| 15 | replay |
| 14 | sword 7 |
| 13 | BAR |
| 12 | bell |
| 11 | replay |
| 10 | sword 7 |
| 9 | watermelon |
| 8 | replay |
| 7 | bell |
| 6 | replay |
| 5 | BAR |
| 4 | red 7 |
| 3 | bell |
| 2 | replay |
| 1 | sword 7 |

40R'

Fig. 9

| symbol combination | under general game (bonus-internal-winning) | general game under BB | JAC (combination) game |
|---|---|---|---|
| red 7-red 7-red 7 | 15 coins + BB | | |
| BAR—BAR—BAR | 15 coins + RB | | |
| sword 7-sword 7-sword 7 | 15 coins + SB | | |
| watermelon-watermelon-watermelon | 3 coins | 15 coins | |
| bell-bell-bell | 6 coins | 7 coins | |
| cherry-ANY-ANY | 1 coin | 1 coin | |
| replay-replay-replay | replay | 1 coin + RB | 15 coins |

Fig. 10

| table No. | left<br>center<br>right | left<br>right<br>center | center<br>left<br>right | center<br>right<br>left | right<br>left<br>center | right<br>center<br>left |
|---|---|---|---|---|---|---|
| 1 | ○ | × | × | × | × | × |
| 2 | × | ○ | × | × | × | × |
| 3 | × | × | ○ | × | × | × |
| 4 | × | × | × | ○ | × | × |
| 5 | × | × | × | × | ○ | × |
| 6 | × | × | × | × | × | ○ |

○··· prize won
×··· prize not won

* correct observation push timing not required

Fig. 11

| winning combination | random-number range | winning probability |
|---|---|---|
| SB | 0～2298 | 2299／16384 |
| bell | 2299～11024 | 8726／16384 |
| watermelon | 11025～11165 | 141／16384 |
| cherry | 11166～11385 | 220／16384 |
| replay | 11386～13630 | 2245／16384 |
| BB | 13631～13668 | 38／16384 |
| RB | 13669～13696 | 27／16384 |
| blank | 13697～16383 | 2686／16384 |

random-number range: 0～16383

Fig. 12 A start command

| | |
|---|---|
| 1 | internal-winning combination |
| 2 | SB |
| | bell |
| | watermelon |
| | cherry |
| | replay |
| | BB |
| | RB |
| | blank |

| | |
|---|---|
| 3 | game situation |
| 4 | in general game |
| | under RB internal winning lasting |
| | under BB internal winning lasting |
| | in RB action |
| | in BB action |
| | |
| | |
| | |

| | |
|---|---|
| 5 | selection of stop table |
| 6 | table No. 1 |
| | table No. 2 |
| | table No. 3 |
| | table No. 4 |
| | table No. 5 |
| | table No. 6 |
| | |
| | |

Fig. 12 B reel stop command

| | |
|---|---|
| 1 | stop order |
| 2 | first stop |
| | second stop |
| | third stop |
| | |
| | |
| | |
| | |
| | |

| | |
|---|---|
| 3 | stop reel |
| 4 | left reel |
| | center reel |
| | right reel |
| | |
| | |
| | |
| | |
| | |

| | |
|---|---|
| 5 | stop position |
| 6 | 0~21 |

Fig. 12 C one-game end command

| | |
|---|---|
| 1 | prize winning kind |
| 2 | SB |
| | bell |
| | watermelon |
| | cherry |
| | replay |
| | BB |
| | RB |
| | blank |

| | |
|---|---|
| 3 | bonus game situation |
| 4 | general game 1 in BB |
| | general game 2 in BB |
| | general game 3 in BB |
| | RB game 1 |
| | RB game 2 |
| | RB game 3 |
| | RB end |
| | BB end |

Fig. 19 A

| winning kind | winning kind | | | |
|---|---|---|---|---|
| | BB | RB | watermelon | SB |
| winning | 0～45 | 0～56 | 0～20 | 0～11 |
| blank | 46～127 | 57～127 | 24～127 | 12～127 |

random-number range: 0～127

Fig. 19 B

| bell display number | winning kind | | | |
|---|---|---|---|---|
| | BB | RB | watermelon | SB |
| all | 0～84 | 0～96 | 0～20 | 0～8 |
| appearance number-1 | 85～121 | 97～127 | 21～52 | 9～21 |
| appearance number-2 | 122～127 | — | 53～90 | 22～38 |
| appearance number-3 | — | — | 91～116 | 39～95 |
| appearance number-4 | — | — | 117～123 | 96～120 |
| appearance number-5 | — | — | 124～127 | 121～127 |

random-number range: 0～127

Fig. 20

| established flag | BR continuation frequency | | | |
|---|---|---|---|---|
| | 10 games | 50 games | 100 games | blank |
| watermelon | 0～10 | 11～13 | 14～15 | 16～127 |
| two cherries | 0～6 | 7～10 | – | 11～127 |
| blank | 0～14 | – | 15～24 | 25～127 |

random-number range: 0～127

GAMING MACHINE HAVING A STOP ORDER ASSOCIATED WITH A PRIZE-WINNING COMBINATION

FIELD OF TECHNOLOGY

The present invention relates to a symbol combination gaming machine such as a slot machine and a pachinko gaming machine comprising variable display means for variably displaying various symbols and a function to control the variable display to provide a player with a benefit based on the result.

DESCRIPTION OF RELATED ART

A slot machine can be cited as a typical example of this kind of gaming machine. The slot machine has a plurality of rotating reels, each of which has a plurality of symbols provided on a periphery thereof. The slot machine is configured such that a predetermined amount of coins or award is paid out if a combination of symbols coincide with a predetermined combination, for example, if the same kind of symbols are lined up along a straight line such that the combination is one of the winning combinations when the rotating reels are stopped. In general, various kinds of contingencies are often involved to win the game. The gaming machine has gambling characteristics or is characterized by such contingencies that a player may not be able to totally control his game results with his skills.

In order to realize the "contingency," various methods have been adopted. Recently, a control method called "pre-determination," in which a software-based winning lottery is executed using a microcomputer and the reels are then controlled to stop based on the result of the lottery, is mainly adopted in slot machines. For example, the slot machine described in Japanese Published Examined Patent Application No. H3-72313 is a so-called pachi-slot gaming machine with stop buttons. This pachi-slot gaming machine comprises random number sampling means, which samples a random number based on a start lever operation by the player, and a winning probability table, which is divided into the respective random number ranges of "big hit," "mid hit," and "small hit" in accordance with the ranks of winning combinations, and when a sampled random number falls within a winning region of the winning probability table, the gaming machine determines that the corresponding winning combination is won and sets the hit (winning) flag of this winning combination. These winning flags include the winning flag of the winning combination called the "small winning combination," which is generated when matching predetermined symbols (e.g., the "bell" or "cherry" symbol) line up along an activated pay line and by which about ten coins are paid out, and the winning flag of the winning combination called a "winning combination for a bonus game," which is generated when matching predetermined symbols (e.g., "7" or "BAR" symbol) line up and by which a state, wherein a winning is more easily generated than normal gaming states, is entered for a predetermined number of times of gaming and the payout of about 100 to 400 coins can be received.

The state that the winning flag is established is the one called "internal winning" in general. A related winning combination is just allowed to be lined up along the pay line and no winning is generated actually. In order to generate a winning, rotating winning symbols will be controlled with a timing to stop them along a pay line (normally, within four frames). This operation may be called "observation push." The term, "observation push" refers to carrying out the stopping operation by carefully observing each of the reels so as to get desirable symbols along a pay line. If this operation timing is bad, the winning is not generated though the internal winning is generated. This state is called "missed winning."

This missed winning may be called failing observation push on the whole and its causes may include several patterns. In a first pattern, though the symbol to be aimed at is determined, a player fails to stop the reels as he aimed because he cannot recognize the varying symbols. In a second pattern, a plurality of winning combinations are internally won in the current game but the player fails to stop the reels so as to win because he cannot decide which symbol to be aimed at in performing the stopping operation.

In the former case, the player can improve accuracy to some degree by becoming skilled in the observation push technique. However, in the latter case, the player must ascertain the internal winning state, which cannot be seen from the outside, and improvement of the accuracy of observation push is not possible no matter how skilled the player is in the observation push.

Conversely, as long as the internal winning combination is informed, it is possible to realize a gaming state which enables a large number of coins to be paid out like in a bonus game although it is in a normal gaming state. There are gaming machines having a function called "Assist Time (AT)," which makes use of this gaming property unique to the pachi-slot machine when predetermined conditions are satisfied so that the establishment of internal winning and the kind of the internal winning combination are notified for a predetermined period of time to reduce the occurrence of missed winning, thereby realizing the payout of a larger amount of coins than that in a normal gaming state in which no notification is made. Though this state falls under the category of "general gaming state," among the "gaming state" categories to be described later, specifications can be arranged so that the actual amount of coins paid out will be comparable to that in the bonus game.

There is also a function "Super Time (ST)," which changes the amount of coins paid out based on whether winning of "internal winning state" is established or not. When a rotating reel is controlled to stop by the operation of a stop button by the player, a plurality of "stop tables" for determining the number of frames slipped from the symbol position at which the stop operation has been carried out are provided, a stop table is selected by a random number lottery at every time when a winning combination is won internally. Here, being won internally refers to getting the internal winning. The stop control of the function is arranged such that no winning is generated, even if buttons are so pressed at the timing by the observation push that the reel should stop on the activated pay line, unless a stop operation is carried out in the order of the stop operation specified in the stop table. The function of Super Time (ST) realizes a large number of coins comparable to the bonus game as "AT function" mentioned above by assigning an "notified" state of the type of the stop table selected and an "unnotified" state of that to the selected stop table.

For example, if there are three stop buttons, one for stopping the left reel, one for stopping the middle reel, and one for stopping the right reel, the six kinds of operation orders of "left stop, middle stop, right stop," "left stop, right stop, middle stop," "right stop, left stop, middle stop," "middle stop, right stop, left stop," and "middle stop, left stop, right stop" are prepared and arrangements are made so that winning is not generated unless operation is performed exactly according to the operation order in the stop table selected by the random number lottery.

Though the player plays the game wishing that such a special gaming state will be generated, the probability that a special gaming state will be generated is extremely low. Pachi-slot gaming machines that are presently installed are thus equipped with various notification effect functions for maintaining a player's expectation during a normal gaming state. Notification effects include those that notify that a winning combination or the above-described AT gaming or ST gaming state has been won internally and those that notify that a state, in which the lottery winning probability of such a special gaming state is high, has been entered, and the notifications are made to the player by means of modes of blinking of lamps provided at the left and right sides of a panel display, images displayed on a liquid crystal display device, etc.

When Super Time (ST) game occurs, the order in which reels are to be stopped (stop buttons are to be operated) is notified by back lamps provided in the interior of the respective reels, lamps provided in correspondence to the respective reels, or a liquid crystal display device, dot display device, or other image display unit, an audio output generated from a speaker, etc. For example, in the case where the stopping order is notified by use of back lights, the back light of the reel to be stopped is turned on and the other back lights of the other reels are turned off to indicate the reel (stop button) that is to be subject to a stopping operation.

And when the stopping operation is performed in accordance with the indicated stopping order, the probability of generation of a specific winning combination increases and the pay out of a large amount of coins occurs within a short time. With a current gaming machine, when a winning is generated, a notification is made wherein the winning symbols are highlighted by the blinking of reel back lamps provided behind the reels to enable a player to determine which winning symbols are matched along which pay line.

However, since such an effect display device is obviously installed at a position that differs from the positions at which the reels are installed, constant shifting of the sight line is demanded in order to check the display contents of the reels and the display contents of the effect display device in accordance with the gaming conditions, thus increasing the fatigue of the player.

Also, though there are gaming machines, with which various image effects are executed by means of a liquid crystal panel or EL panel that is positioned in front of the reels, the reel symbols at the back are inevitably visible through the display panel and interfere with the image effect, thus making it difficult to express images effectively.

An object of the present invention is to provide a gaming machine, with which a large amount of coins are paid out by indication of an operation method that is advantageous to the player, wherein the contents of the indication are notified to the player clearly and the player may play the game comfortably.

However, in a case where the means for notifying stopping order is an image display unit or lamp, etc., since a player needs to perform the reel stopping operation upon checking the indication contents displayed by the image display unit or lamp and cannot avoid performing a sight line movement from "display device" to "reel", fatigue may be increased by playing in the Super Time (ST) gaming state.

Also, in the case of stopping order notification by audio means, the notified contents may not be heard well due to game sound generated by gaming machines in the surroundings, for example, when the bonus game is occurring at an adjacent gaming machine.

In the case of stopping order notification by means of reel back lights, though the sight line movement, difficulty of hearing an audio output, etc., do not occur, it is difficult to recognize whether or not a back light is lit in a case where the illumination of a parlor is comparatively bright, etc.

However, since such an effect display device is obviously installed at a position that differs from the positions at which the reels are installed, constant shifting of the sight line is demanded in order to check the display contents of the reels and the display contents of the effect display device in accordance with the gaming conditions, thus increasing the fatigue of a player.

Also, though there are gaming machines, with which various image effects are executed by means of a liquid crystal panel or EL panel that is positioned in front of the reels, the reel symbols at the back side are inevitably visible through the display panel and interfere with the image effect, thus making it difficult to express images effectively.

However, even if the winning symbols are illuminated from the back side by reel back lamps, the other reel symbols do not disappear from the field of view of a player, and in the case of a gaming hall with relatively bright indoor illumination, it is difficult to distinguish between winning symbols and other symbols and it thus cannot be said that the symbols corresponding to a winning are being notified effectively.

Also, during the ST gaming, since it is important to perform the stopping operations in accordance with the appropriate stopping order and there is not a strong need to perform observation push to stop winning symbols along the pay line, the player tends not to pay much attention to the reel stop mode and thus cannot readily recognize which winning symbols are aligned along which pay line.

An object of the present invention is to provide a gaming machine, which is rich in gaming effects and which at winning performs highlighted display of the corresponding winning symbols to effectively notify to the player which winning symbols are aligned along which pay line.

Though obviously the player performs the stopping operations in accordance with the notified stopping order, there are occasional cases where a player erroneously performs the stopping operations in a different order from the notified order and wastes the game that would have resulted in the winning of the winning and the payout of coins.

A gaming machine has thus been proposed with which, when a player performs an erroneous stopping operation, an image expressing the occurrence of missed winning is displayed on a liquid crystal display device or a sound that differs from the normal reel stopping sound is emitted from a speaker to notify and bring attention to the player that an erroneous operation has been performed.

However, since a player will still perform the stopping operations while staring at the rotating reels, the player will not check the image effect in many cases as this will require the movement of the sight line in order to view the image on the liquid crystal display device, etc. The player thus cannot understand that a winning was not generated because he/she performed the wrong stopping operation.

An object of the present invention is to provide a gaming machine, which, during the special gaming state, pays out a large amount of coins by indicating an operation method that is advantageous to the player and effectively notifies to the player whether or not an appropriate stopping operation has been performed to enable the player to play the special gaming state without fail.

SUMMARY OF THE INVENTION

The gaming machine of the present invention comprises: variable display means for variably displaying various symbols; lottery means for executing a lottery of winning combinations; stop control means for performing stop control of the abovementioned variable display; shielding means for shielding, the shielding means being disposed in front of the abovementioned variable display means; and shielding control means for performing switch control between a state enabling a player to visually recognize the symbols and a state disabling the player from visually recognizing the symbols; and when winning symbols, selected by the lottery, stop along an activated line, the shielding control means shields other display regions than a display region of the winning symbols.

According to the present invention, a gaming machine comprises: variable display means for variably displaying a plurality of symbols; lottery means for executing a lottery of winning combination; stop control means for controlling and stopping the variable display; stop control selection means for selecting the kind of control of the stop control means in accordance with the result of the lottery; shielding means which is disposed in front of the variable display means; and shielding control means for controlling the shielding means between in a state enabling a player to visually recognize the symbols and in a state disabling the player from visually recognizing the symbols in accordance with the contents of selection by the stop control selection means. The term, "kind of control" or "control kind," refers to selections of controlling. Here, the stopping operation and the stop table may be included in the selections.

The shielding control may be carried out in a manner such that when as a result of the stopping operation by the player, a symbol of an internally won winning combination exists among the reel symbols that are stopped along a pay line, the region displaying the winning symbol is set in a transmissive state and the regions displaying other symbols are set in a shielding state.

With such an arrangement, since other reel symbols than the winning symbols are hidden by an electronic shutter and only the winning combination is put in visually recognizable states, it is clear at a glance which winning combination has become established along which pay line and the winning effect can thus be notified effectively to the player.

The gaming machine further comprises special gaming control means, which generates, based on a predetermined condition, a special gaming state that is advantageous to the player, wherein the shielding control means may activate the shielding means during the special gaming state.

With an embodiment to be described later, the ST gaming, in which an appropriate stopping order is indicated, will be referred to as a special state that is advantageous to the player. When symbols of an internally won winning combination exist in the reel symbols that are stopped along a pay line during this ST gaming, regions displaying the winning symbols may be set into a transmissive state and the other regions may be set into a shielded state.

With such an arrangement, even during the ST gaming, in which the attention of the player is directed just to the stopping order and the concentration regarding which symbols are displayed in stopped states tends to be interrupted, the winning symbols and the pay line can be notified to the player effectively.

Furthermore, the shielding means may comprise an electronic shutter.

With the embodiment to be described below, a liquid crystal film is described as an example of an electronic shutter and the switching between the transmissive and shielding states is executed by means of voltage application states.

With such an arrangement, the switching between the transmissive and shielding states can be performed instantaneously and since the shielding regions can be controlled by software, finer effect control is enabled.

The gaming machine of the present invention comprises: variable display means for variably displaying various symbols; lottery means for executing a lottery of winning combinations; stop control means for performing stop control of the variable display; effect display means for displaying effect images; shielding means, which is disposed in front of the variable display means; and effect control means for controlling the shielding means and the effect control means; and the effect control means is switchable, based on a predetermined condition, between a first control state that the shielding means is in a transmissive or a semi-transparent state and the effect display means is controlled in a state that the player is capable of visually recognizing the symbols, and a second control state that the shielding means is in a shielding state and the effect control means is controlled in a state that the player is disabled from visually recognizing the symbols.

According to the present invention, an effect display comprising a transparent liquid crystal is disposed in front of the reels, which may be the variable display means, in which various forms of effect control are performed. An electronic shutter comprising a liquid crystal film that may be disposed between the reels and the effect display. Switch control between the first control state that the display modes of the reels at the back are visually recognizable by transmission through the effect images, and the second control state that the display modes of the reels at the back are made unable or difficult to be recognized visually due to the electronic shutter is enabled by executing transmissive/shielding control of the electronic shutter in accordance with the gaming states.

With such an arrangement, since an effect, which is displayed with the electronic shutter being in the transmissive state, enables the reel symbols at the back to be visually recognizable through regions at which the effect is not displayed, an effect mode in which reel symbols are mixed with an image effect can be expressed. With an effect displayed with the electronic shutter in the shielding state, since an extraneous background will not be visible and the electronic shutter serves the role of a reflecting plate as well, an even clearer image effect can be expressed.

Furthermore, according to the present invention, the shielding control means may be arranged to control at least part of a panel display in the first control state while the variable display means is performing variable display and in the second control state when the variable display is stopped.

In regard to the timing of control of the electronic shutter in the embodiment to be described below, control in the first control state of the transmissive state is performed while the reels, which are the variable display means, are rotating so as not to hinder observation push, and control in the second state of the shielding state is performed when the rotations of the reels are stopped.

With such an arrangement, the troublesome situation, wherein the electronic shutter is put in the shielding state even when the reels are rotating and observation push of reel symbols is thereby disabled, can be resolved to make the game more interesting.

With the embodiment to be described below, a liquid crystal film is referred to as an example of an electronic shutter and the switching between the transmissive and shielding states is executed by means of voltage application states.

The gaming machine according to the present invention may comprise: variable display means for variably displaying various symbols; lottery means for executing a lottery of winning combinations; stop control means for performing stop control of the variable display; shielding means which is disposed in front of the variable display means; and shielding control means for performing, in accordance with the activation of the stop control means, switch control between a state enabling the player to visually recognize the symbols and a state disabling the player from visually recognizing the symbols.

With this invention, an electronic shutter, which may be composed of a liquid crystal film, is disposed in front of the reels, and shielding of reel regions is controlled in accordance with the game conditions. The variable display means includes a variable display device, which may be composed of one or more reels.

The shielding control may be executed in accordance with the stop button operations by the player and effect control may be executed in accordance with changes in the gaming state.

With such an arrangement, since it becomes possible to leave just the display regions that are to be displayed to the player in a highlighted manner and shield the other display regions in accordance with stop button operations of the player, information that matches changes in the gaming situation can be transmitted effectively without being influenced by the installation positions of the display devices, the brightness of lamps, etc.

Furthermore with the present invention, a special gaming control means, which generates, based on a predetermined condition, a special gaming state that is advantageous to the player, may be included, and the shielding control means may activate the shielding means during the special gaming state.

With an embodiment to be described below, the Super Time (ST) gaming state, in which an appropriate stopping order is indicated, is cited as a special state that is advantageous to the player, and in this Super Time (ST) gaming state, the stopping order is indicated by putting the electronic shutter in a transmissive state at the display area of a reel that is to be stopped and in a shielding state at the display areas of the other reels.

With such an arrangement, it becomes possible, in performing stopping operations during the ST gaming, to play the ST gaming without movement of the sight line from the image display unit, on which the stopping order is displayed, to the reels. Since control is carried out in accordance with the stopping operations by the player, the degree of fatigue of the player will be reduced.

According to the present invention, there is provided a gaming machine comprising: variable display means for variably displaying various symbols; lottery means for executing a lottery of winning combinations; stop control means for performing stop control of the variable display; shielding means, which is disposed in front of the variable display means; and shielding control means for performing, in accordance with the activation of the stop control means, switch control between a state enabling a player to visually recognize the symbols and a state disabling the player from visually recognizing the symbols; the shielding control means may perform switch control of putting at least part of the shielding means in the shielding state under the condition that all of the variable displays have stopped.

According to the present invention, an effect display which may comprise a transparent liquid crystal is disposed in front of reels, which are the variable display means, to perform various effect control. An electronic shutter which may comprise a liquid crystal film is furthermore disposed between the reels and the effect display. Transmissive/shielding control of the electronic shutter is executed in accordance with the gaming states to present clearer effect images. In particular, by activating the electronic shutter across the entire display panel and executing effect control after the stoppage of all reels, images of greater impact can be presented.

With such an arrangement, since the electronic shutter is activated in the state that all reels are stopped and since the electronic shutter can thus be controlled to be in the shielding state across the entire display panel without considering the hindering of observation push, which can be a problem in electronic shutter control during rotation of the reels, the execution of large and clear image effects may be enabled.

Furthermore according to the present invention, the shielding control means may be arranged to control at least part of a panel display in the first control state while the variable display means is performing variable display.

With such an arrangement, the troublesome situation, wherein the electronic shutter is put in the shielding state even when the reels are rotating and observation push of reel symbols is thereby disabled, can be resolved to make the game more interesting.

According to the present invention, the gaming machine may comprise: variable display means for variably displaying various symbols; lottery means for executing a lottery of winning combinations; stop control means for performing stop control of the variable display; stop control selection means for selecting the kind of control of the stop control means in reference to the results of the lottery; shielding means, which is disposed in front of the variable display means; and shielding control means for performing, in accordance with the contents of selection by the stop control selection means, switch control of the shielding means between a state enabling a player to visually recognize the symbols and a state disabling the player from visually recognizing the symbols; wherein the shielding control means may perform, in accordance with the kind of stopping operation by the player, switch control between a first shielding state that is executed when a stopping operation that matches the control kind is performed, and a second shielding state that is executed when a stopping operation that does not match the control kind is performed.

According to the present invention, an electronic shutter, which may be composed of a liquid crystal film, is disposed in front of reels, and shielding of the reel regions is controlled in accordance with the game conditions. The variable display means includes a variable display device, which may be composed of one or more reels.

Particularly during the ST gaming, in which the appropriate stopping order is notified and shielding control is executed in accordance with player's stop button operations, by putting the electronic shutter in the shielding state across all regions when an erroneous stopping operation is performed, it may be notified to the player that that the erroneous operation has been performed.

With such an arrangement, it is notified to the player without fail and without making the player move his/her sight line to other display devices that an erroneous stopping has been performed during the ST gaming.

Furthermore, according to the present invention, an effect display displaying effect images may be disposed in front of the variable display means, and a predetermined effect image may be displayed on the effect display after the second shielding state is executed.

With the embodiment to be described later, after an erroneous stopping operation has been performed during the ST gaming and the electronic shutter has been put into a shielding state across the entire regions, an "x" mark is displayed on a transparent liquid crystal, which is the effect display.

With such an arrangement, since the performing of an erroneous operation is notified to the player not only by the electronic shutter but also by an image, the information can be transmitted to the player more definitely.

BRIEF DESCRIPTION OF THE DRAWINGS

FIG. 8A shows, in an unfolded manner, symbols which are placed along an outer peripheral surface of a left reel.

FIG. 8B shows, in an unfolded manner, symbols which are placed along an outer peripheral surface of a middle reel.

FIG. 8C shows, in an unfolded manner, symbols which are placed along an outer peripheral surface of a right reel.

FIG. 9 is a diagram showing symbol combinations and payout numbers of the respective winning combinations.

FIG. 10 is a diagram showing a stop table that is selected when internal winning of a bell winning combination occurs.

FIG. 11 is a diagram showing a winning probability table.

FIG. 12A shows a list of start commands sent to the sub-control circuit.

FIG. 12B shows a list of reel stop commands sent to the sub-control circuit.

FIG. 12C shows a list of one game completion commands sent to the sub-control circuit.

FIG. 19A shows an effect preview generation table.

FIG. 19B shows an effect kind selection table.

FIG. 20 shows a BR generation and BR continuing number lottery table.

DETAILED DESCRIPTION OF THE INVENTION

Figure 1:
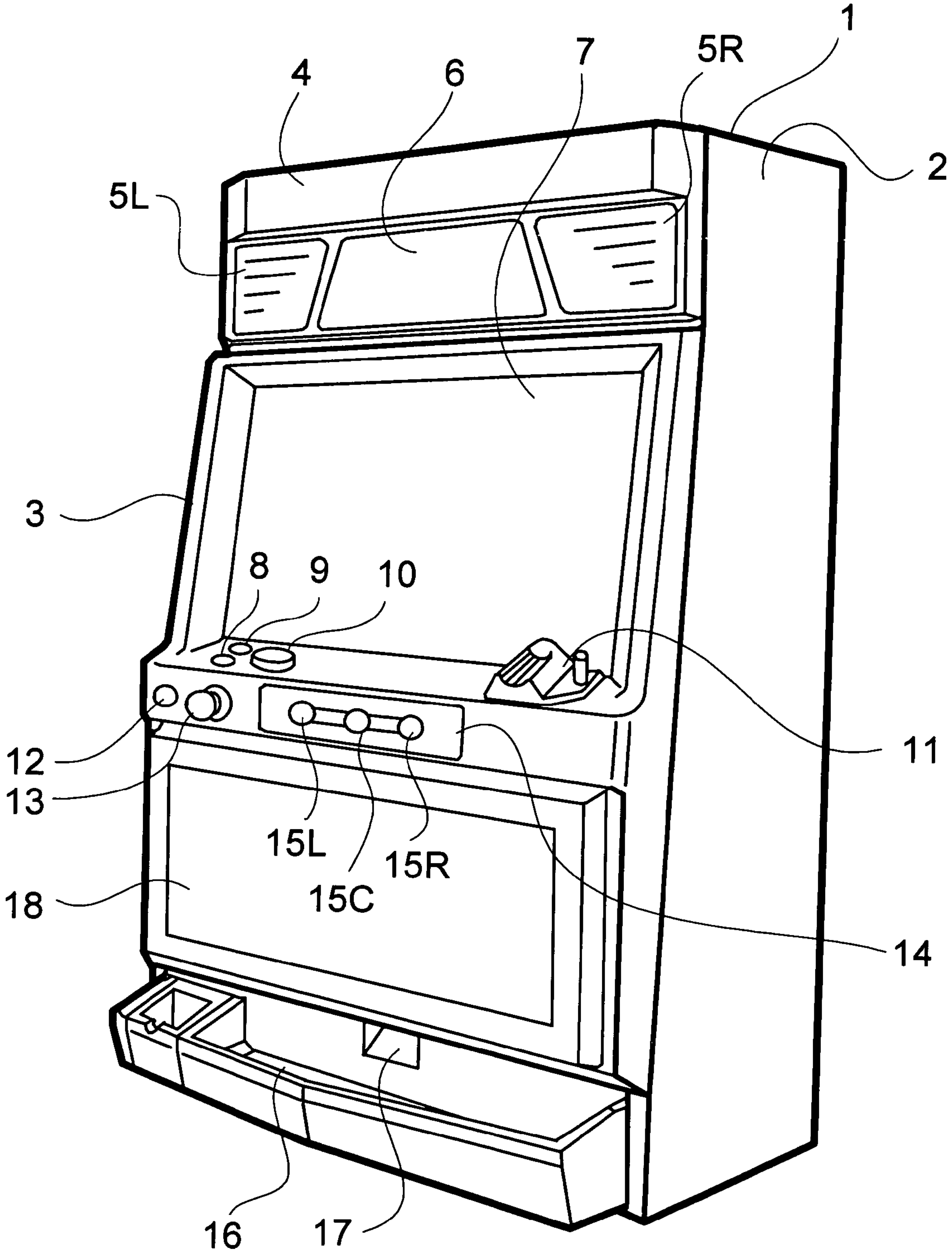
FIG. 1 is a perspective view of a pachi-slot gaming machine of an embodiment according to the present invention.

FIG. 1 is an external view of an embodiment of a gaming machine with stop buttons, that is, a so-called pachi-slot gaming machine according to the present invention. A front door 3 is attached, in a manner enabling opening and closing, to a plywood, box-shaped cabinet 2 of a pachi-slot gaming machine 1. Above the front door 3 are provided a gaming state display lamp 4, which lights up or flashes in different lighting patterns corresponding to the occurrence of the bonus game, error, etc., speakers 5L and 5R, which generate effect sounds and error sounds during game, and a payout table 6, indicating payout numbers of each winning combination and a brief explanation of game. A substantially vertical panel display unit 7 is provided at the center of the front door 3.

At the lower left of the panel display unit 7 are provided a 1-BET switch 8, a 2-BET switch 9, and a MAX-BET switch 10. Under the condition that coins are credited, one coin is bet in a game by one push of 1-BET switch 8, two coins are bet in a game by one push of 2-BET switch 9, and three coins, which is the maximum number of coins that can be bet in a single game, are bet in a game by one push of MAX-BET switch 10. By operating these switches, a predetermined pay line is activated. Also, a coin insertion slot 11, into which coins are loaded, is provided at the lower right of panel display unit 7.

C/P (credit/payout) switch 12, by which a player can switch between crediting the coins won in a game and receiving a payout with a push button operation, is provided at the left side of the center of the front door 3. By the switching of C/P switch 12, coins are paid out to a coin payout opening 17 at the bottom of the front door 3, and paid out coins are stored in a coin tray 16. A start lever 13, which can be rotated freely within a predetermined angle range, is provided at the right side of C/P switch 12. When the start lever 13 is operated by a player, the reels provided in the inner from the panel display unit 7 begin rotating.

At the center of front door 3 is provided a stop operation part 14, by which stopping means for stopping each of the plurality of rotating reels is arranged. Stop operation part 14 comprises a left stop button 15L, a middle stop button 15C, and a right stop button 15R, and a player can freely determine the order in which these stop buttons 15L, 15C, and 15R are pushed. In general, a stop operation that is carried out when all reels are rotating is called a "first stop operation," the stop operation that is carried out next is called a "second stop operation," and the stop operation that is carried out last is called a "third stop operation." With the present embodiment, the push of left stop button 15L as the first stop operation is called "normal push," the push of middle stop button 15C as the first stop operation is called "middle push," and the push of right stop button 15R as the first stop operation is called "reverse push."

In the case of a gaming machine with three buttons, there are a total of six stop operation order types. Operating left stop button 15L as the first stop operation, middle stop button 15C as the second stop operation, and right stop button 15R as the third stop operation is called "left-middle-right push." Operating middle stop button 15C as the first stop operation, left stop button 15L as the second stop operation, and right stop button 15R as the third stop operation is called "middle-left-right push." Operating middle stop button 15C as the first stop operation, right stop button 15R as the second stop operation, and left stop button 15L as the third stop operation is called "middle-right-left push." Operating left stop button 15L as the first stop operation, right stop button 15R as the second stop operation, and middle stop button 15C as the third stop operation is called "left-right-middle push." Operating right stop button 15R as the first stop operation, left stop button 15L as the second stop operation, and middle stop button 15C as third stop operation is called "right-left-middle push." Operating right stop button 15R as the first stop operation, middle stop button 15C as the second stop operation, and left stop button 15L as the third stop operation is called "right-middle-left push."

Figure 2:
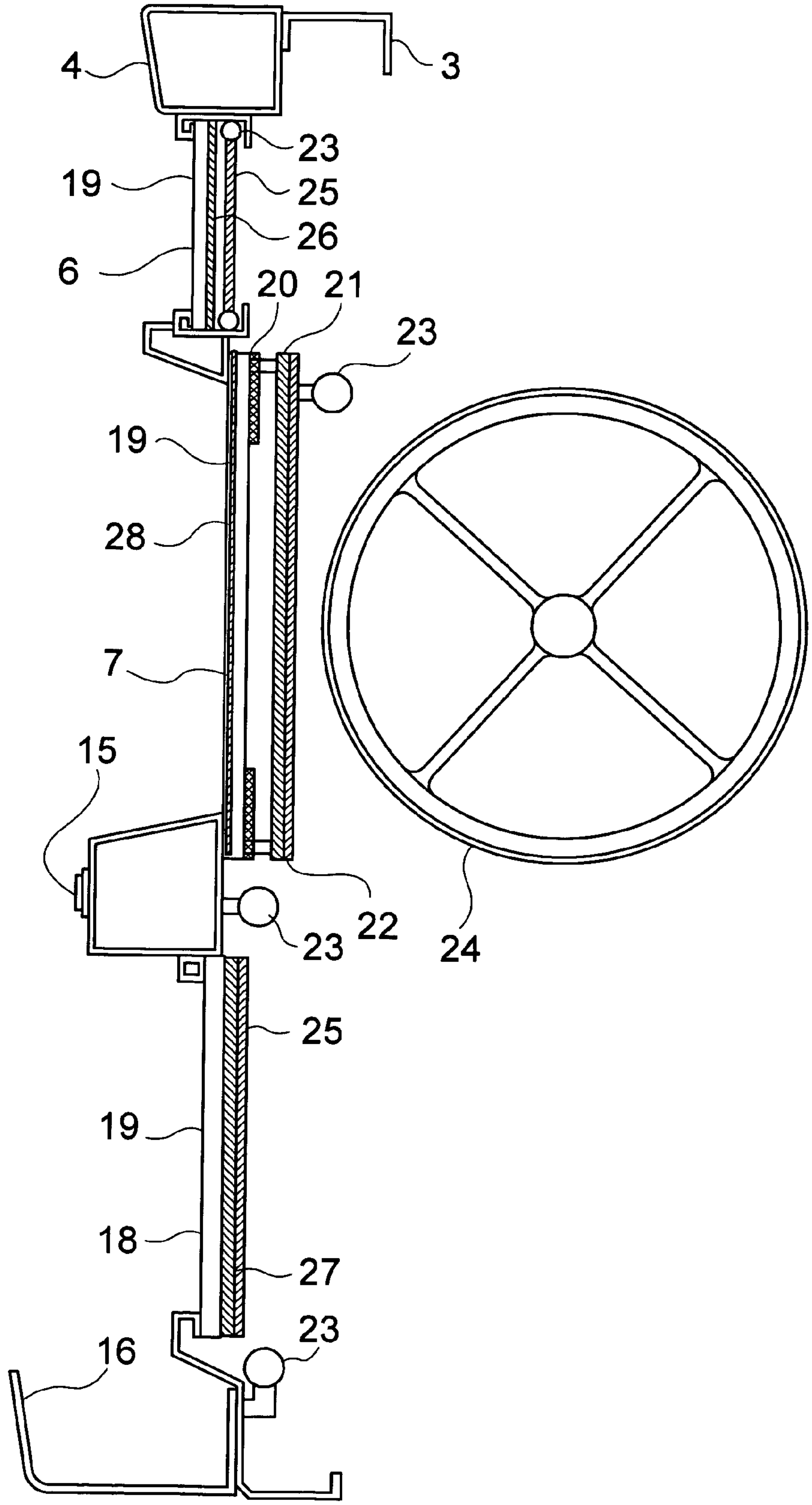
FIG. 2 is a sectional view of the gaming machine around the panel display unit.

FIG. 2 is a sectional view of panel display unit 7 of pachi-slot gaming machine 1. At the inner surface side of panel display unit 7, which is composed of a transparent acrylic plate, are laminated on a sheet 20 including a transparent film having a design printed on, an image display unit 21, made of a ITO (Indium Tin Oxide) device or other transparent liquid crystal display devices, and an electronic shutter 22, which is composed of a liquid crystal film, etc. The sheet 20 may have a symbol, a picture, or the like on a surface thereof. At the upper and lower parts at the inner surface side of the panel display unit are provided with cold cathode-ray tubes 23 that serve the functions of a back light for the liquid crystal display and an illumination device for illuminating the symbols on reels 24.

With the present embodiment, an effect display is composed of a panel display unit 7, a sheet 20, an image display unit 21, and an electronic shutter 22. In regard to a function of each display element, the first feature is provided on the sheet 20, and the sheet 20 is characterized in that it is made visually recognizable to the player at all times, regardless of the effect control state of pachi-slot gaming machine 1. The image display unit 21 is a display area for image effects, such as a big winning effect, various notification effects, a preview of the effects, etc. With the electronic shutter 22, by the switching between the transmissive and shielding of predetermined areas in accordance with voltage application states, that is, by the switching between a state enabling visual recognition of the symbol of a reel 24 and a state disabling visual recognition of the symbol of a reel 24, the switching between normal display of an effect executed on the image display unit (a state in which reel 24 is shielded by the electronic shutter and visual recognition of only the effect display is enabled) and semi-transparent (or substantially transparent) display (state in which the reel symbol in the background can be visually recognized through the effect display) is enabled.

Figure 3:
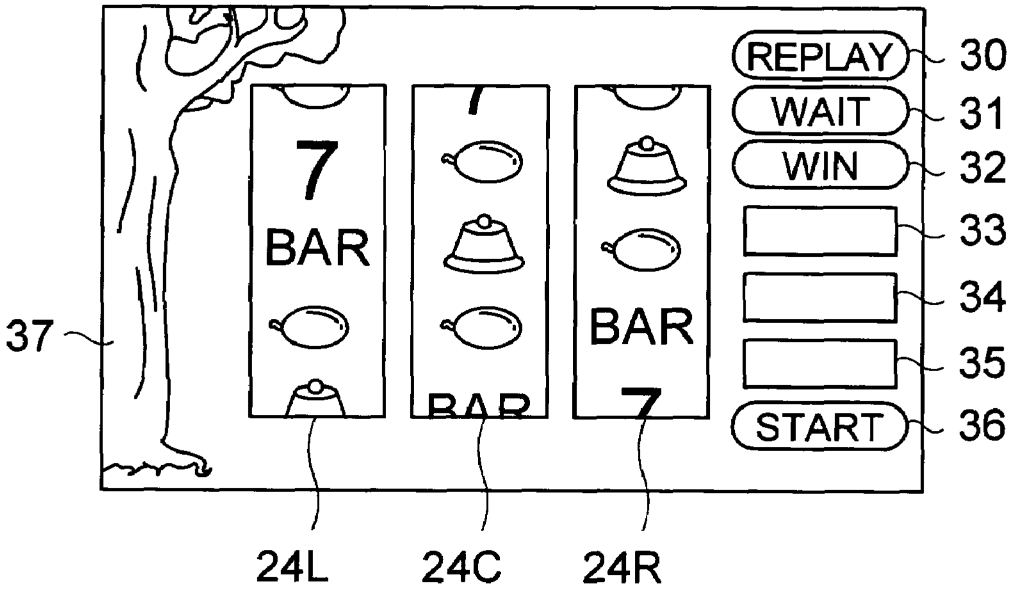
FIG. 3 is a front view of the panel display unit.

FIG. 3 is an enlarged view of panel display unit 7. At the center of the panel display unit are provided a left reel 24L, a middle reel 24C, and a right reel 24R, which constitute the variable display means. At the right side of the front panel are provided various game condition indication lamps and seven-segment display areas. A REPLAY lamp 30 lights up when a replay is awarded in a currently played game. A WAIT lamp 31 is lit when start lever 13 is operated in the current game without 4.1 seconds having elapsed since operation in a previous game and thereby notifies that the WAIT time is in progress. A WIN lamp 32 becomes lit at a predetermined probability in a case where internal winning of a winning combination for a bonus game is realized, thereby notifying that the internal winning of a bonus is realized at 100% certainty. A start lamp 36 becomes lit when a coin loading operation, the operation of any of the various BET switches, or other betting operation is performed and acceptance of the operation of start lever 13 becomes activated. In-bonus information display area 33 displays the remaining number of times in which normal game is enabled in the big bonus ("BB," herein after) state, etc., and mainly notifies the conditions of progress of the bonus game. Credit display area 34 displays the number of coins credited within the gaming machine. Payout display area 35 displays the number of coins paid out upon generation of winnings. If the C/P switch 12 is in the credit state, the coins to be paid out are credited. If the C/P switch is in the payout state, the coins to be paid out are paid out.

Figure 4:
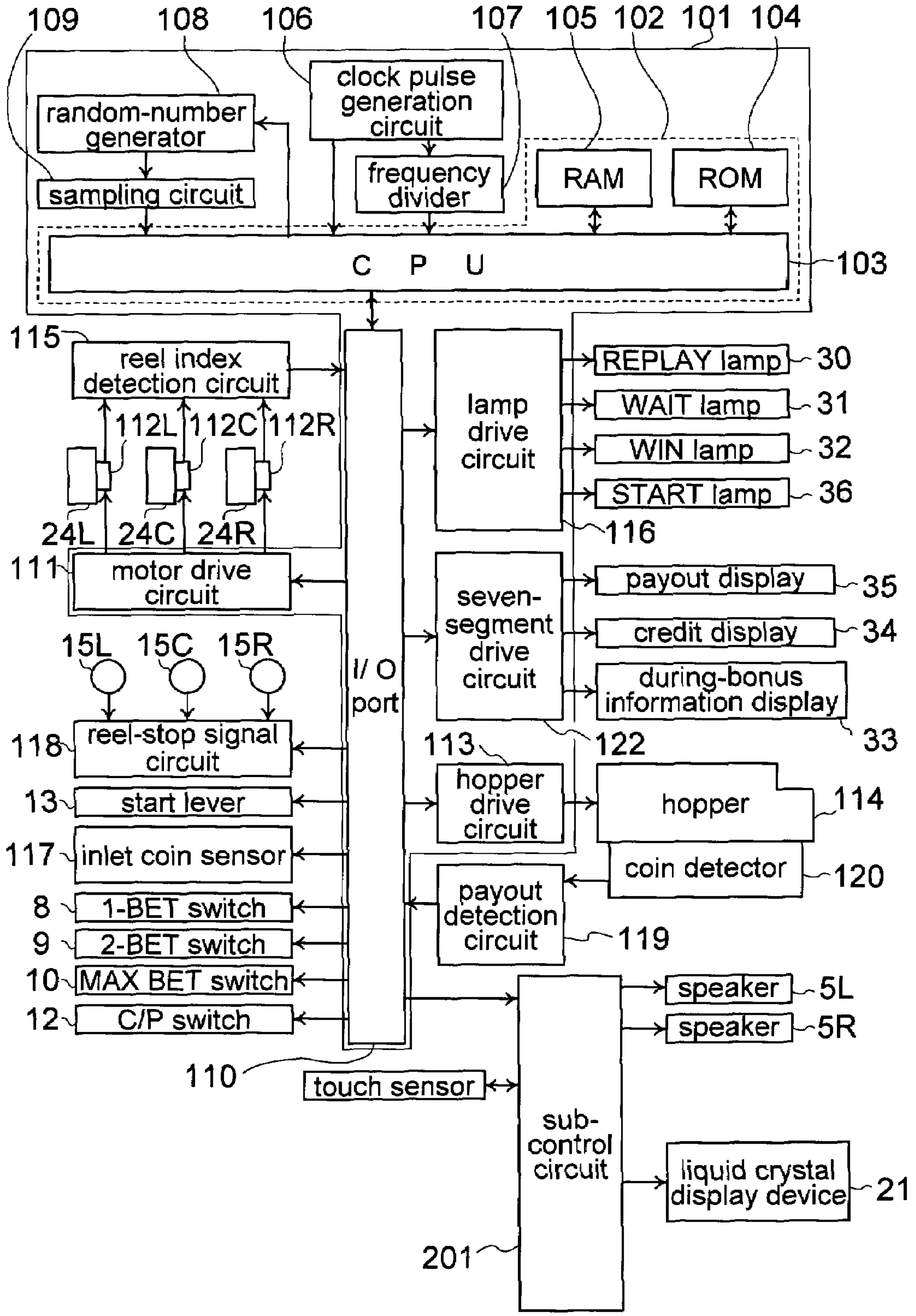
FIG. 4 is a block diagram showing a main control circuit.

FIG. 4 is a block diagram of a circuit for realizing the operation of pachi-slot gaming machine 1 shown in FIG. 1. A control unit of this embodiment is mainly composed of two control circuits. Game control means may include the control unit. A main control circuit 101 controls various electrically connected peripheral devices based on input signals from various detectors. A sub-control circuit 201 controls the effect images displayed on the image display unit 21, effect sounds generated from speakers 5L and 5R, etc., based on game information sent from main control circuit 101 and operation inputs from a touch panel provided in panel display unit 7.

Main control circuit 101 is mainly comprised of a microcomputer 102, which is set up on a circuit board, and is additionally composed of a circuit for random number sampling. Microcomputer 102 comprises a ROM 104, in which a game program and data are stored in advance, a CPU 103, which carries out control operations according to the game program in ROM 104, and a RAM 105, which provides the working area necessary for the control process.

A clock pulse generating circuit 106 and a frequency divider 107 for generating standard clock pulses, a random number generator 108 for generating random numbers to be sampled, and a sampling circuit 109 for sampling random numbers based on signals from a start lever 13 to be described below are connected to CPU 103. Random number sampling may be carried out by software processing in microcomputer 102. In that case, random number generator 108 and sampling circuit 109 may be omitted.

A control program for controlling various operations of the pachi-slot gaming machine, a winning probability table, to be used in the probability lottery process described below for determining whether or not a random number obtained based on an operation of start lever 13 corresponds to a win, a stop table, for determining the stopping positions of reels 24L, 24C, and 24R based on the operations of stop buttons 15L, 15C, and 15R, various gaming information commands, sent to sub-control circuit 201, etc., are stored in ROM 104 of microcomputer 102.

Various peripheral devices (actuators) are connected to CPU 103 via an I/O port 110.

A motor drive circuit 111 controls stepping motors 112L, 112C and 112R to rotate reels 24L, 24C, and 24R respectively according to driving signals from CPU 103. Moreover, motor drive circuit 111 controls the stopping of stepping motors 112L, 112C, and 112R according to stop control signals from CPU 103.

A hopper drive circuit 113 controls a hopper 114 as a coin payout device based on a payout command from CPU 103.

A seven-segment drive circuit 121 controls various display areas (in-bonus information display area 33, credit display area 34, payout display area 35) that are composed of seven-segment LED's.

A lamp drive circuit 116 controls the lighting of various display areas (REPLAY lamp 30, WAIT lamp 31, WIN lamp 32, start lamp 36) that are composed of lamps.

In addition, an image display unit 21, the electronic shutter 22, a reel back lamp, etc., are provided as effect display means or image display means for displaying an image variably, and are controlled by the sub-control circuit 201.

The major input signal generation means that generate input signals required by microcomputer 102 for generating control signals for the respective drive circuits include start lever 13, 1-BET switch 8, 2-BET switch 9, MAX-BET switch 10, C/P switch 12, inlet coin sensor 117, reel stop signals circuit 118, reel index detection circuit 115, payout detection circuit 119, etc. These are also connected to CPU 103 via I/O port 110.

Start lever 13 detects a start operation by a player. Inlet coin sensor 117 detects coins that are loaded from coin insertion slot 11 and passed through a selector for blocking deformed coins. Reel stop signal circuit 118 generates stop signals upon detecting the operations of the respective stop buttons 15L, 15C and 15R. Reel index detection circuit 115 supplies CPU 103 with symbol position reset signals upon receiving signals from a rotation reference position detection switch in a stepping motor. Payout detection circuit 119 supplies CPU 103 with payout number signals upon receiving signals from a coin detector 120 in hopper 114.

Figure 6A:
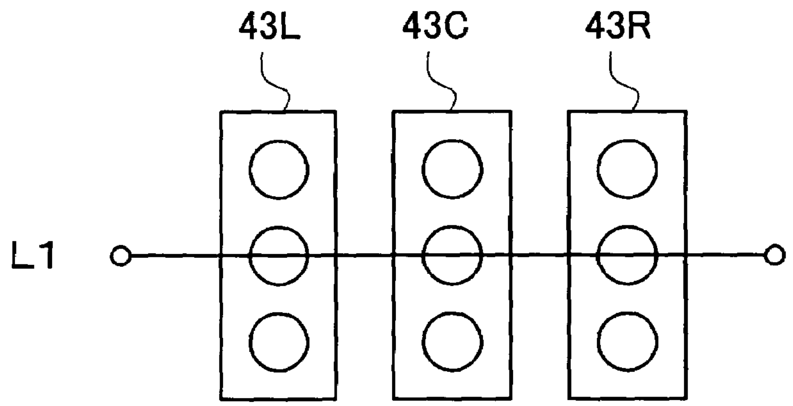
FIG. 6A shows a single pay line.
Figure 6B:
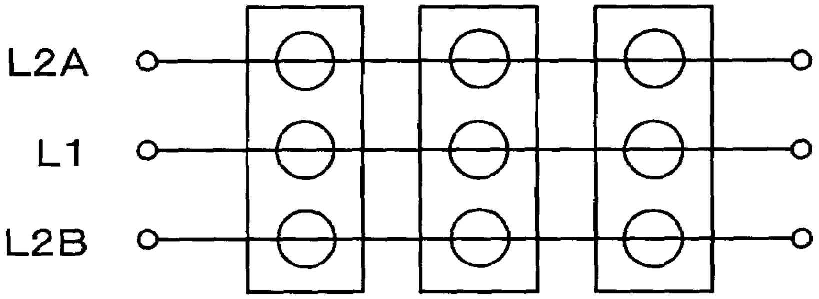
FIG. 6B shows a plurality of pay lines.
Figure 6C:
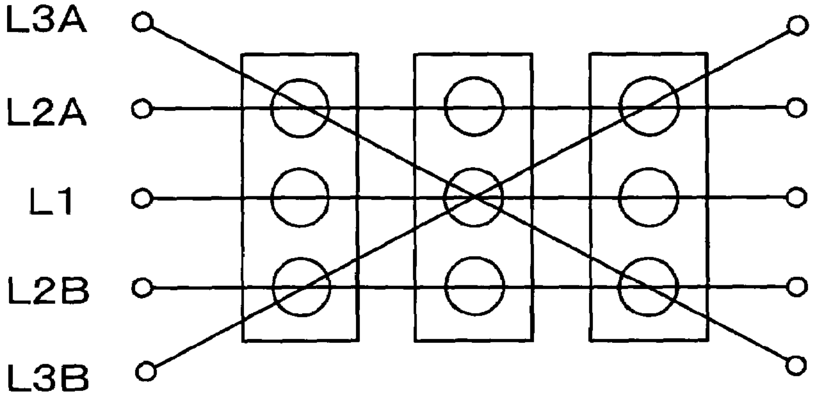
FIG. 6C shows a plurality of pay lines including diagonal lines.

How these drive circuits are controlled within the flow of a game sequence will now be described. First, from the point at which the power switch of pachi-slot gaming machine 1 is turned on, random number generator 108 generates a random number within a fixed numerical range. When inlet coin sensor 117 detects the loading of coins by a player or if coins are credited, when a bet operation by 1-BET switch 8, 2-BET switch 9, or MAX-BET switch 10 is performed, an activated line that is in accordance with the number of betted coins is displayed on the image display unit 21. With regard to the betting operation, as shown in the enlarged view of display windows 43L, 43C, and 43R in FIGS. 6A, 6B, and 6C, a center line L1 is made an active pay line (abbreviated hereinafter as "active line") by a one-bet operation, a top line L2A and a bottom line L2B are made active lines in addition to center line L1 by a two-bet operation, and a cross-down line L3A and a cross-up line L3B are made active lines in addition to center line L1, top line L2A, and bottom line L2B by a three-bet operation.

Next, when start lever 13 detects the game starting operation by a player, a random number is sampled by sampling circuit 109. The sampled random number is compared with the winning probability table stored in ROM 104, and if there is a winning combination, a winning flag for the corresponding winning combination is set to on. This software-base lottery process is referred to as the "probability lottery process," and the details thereof will be described below.

Drive pulses are supplied to each of the stepping motors 112L, 112C, and 112R via motor drive circuit 111 and each of the reels 24L, 24C, and 24R starts rotating. CPU 103 monitors the drive pulses supplied and updates a "pulse counter" secured in RAM 105. The pulse counter value is monitored, and if it becomes a predetermined value, a symbol is determined to have moved by one symbol (also referred to as "one segment"), and the "symbol counter" secured in RAM 105 is incremented by one count.

For example, if a stepping motor performs one rotation at 400 pulses and 21 symbols are arranged on the outer peripheral surface of a reel, since a symbol moves by one segment by about 19 pulses, CPU 103 determines a symbol to have moved by one segment and increments the "symbol counter" by one count when the pulse counter value becomes 19 pulses.

On the other hand, with reels 24L, 24C, and 24R, each time the reference point of a symbol passes the center line L1 of display window 43, an index detection signal is generated and a reset pulse is input into CPU 103 through reel index detection circuit 115 . Upon detecting the input of the reset pulse, CPU 103 clears the symbol counter that is counted up by RAM 105. Correspondence between a symbol position recognized on a software basis and the one actually displayed in the display window 43 is thus ensured.

When reels 24L, 24C, and 24R reach a constant rotation speed after a predetermined period of time from when they start rotating, operations of stop buttons 15L, 15C, and 15R are activated. When a player carries out a stop operation, a reel stop signal is input into CPU 103 via reel stop signals circuit 118. After a processing such as the selection of the stop position, etc., on a software basis, a stop pulse is supplied to the corresponding stepping motor 112L, 112C, or 112R via motor drive circuit 111 and the corresponding reel 24L, 24C, or 24R is stopped.

In carrying out stop control of reels 24L, 24C, and 24R, CPU 103, upon receiving a stop signal from reel stop signals circuit 118, stores in a predetermined area of RAM 105 a code number for the symbol on center line L1 as a stop operation position and refers to a stop table that associates the stop operation position with the symbol to be stopped and displayed at center line L1. CPU 103 then stores a symbol stop position corresponding to the stop operation position in a predetermined area of RAM 105, calculates the number of pulses (segments) to be supplied to stop at the intended symbol, and carries out stop control after supplying the calculated number of pulses.

When the reels 24L, 24C, and 24R are all stopped, a winning search is carried out. In the winning search, the symbol stop positions stored in RAM 105 are compared with a symbol table stored in ROM 104, and the stop mode of the current game that is stopped in display windows 43L, 43C, and 43R is ascertained. The symbol table is configured so as to correspond to the symbol arrangement drawn on the outer peripheral surface of each reel 24L, 24C, and 24R, associates a code number indicating the order of a symbol from a reference position with a symbol code provided in correspondence to the code number, and serves the role of a software-basis reel band. Then, for each active line L1, L2A, L2B, L3A, and L3B, the stop mode is compared with a winning symbol combination table stored in ROM 104 to determine the existence of a winning. The winning symbol combination table associates a winning symbol combination with the number of coins paid out when a winning is won. Processes are performed upon switching the winning symbols in cases where the active winning symbol combination or number of coins paid out is to be differed according to the gaming state.

CPU 103 pays out a predetermined number of coins from the hopper 114 by supplying a payout signal to hopper drive circuit 113 if "the winning" is determined in the winning search. At that time, coin detector 120 counts the number of coins that are paid out from hopper 114 and stops the driving signal to the hopper drive circuit and the payout of coins when the count reaches a predetermined number.

Figure 5:
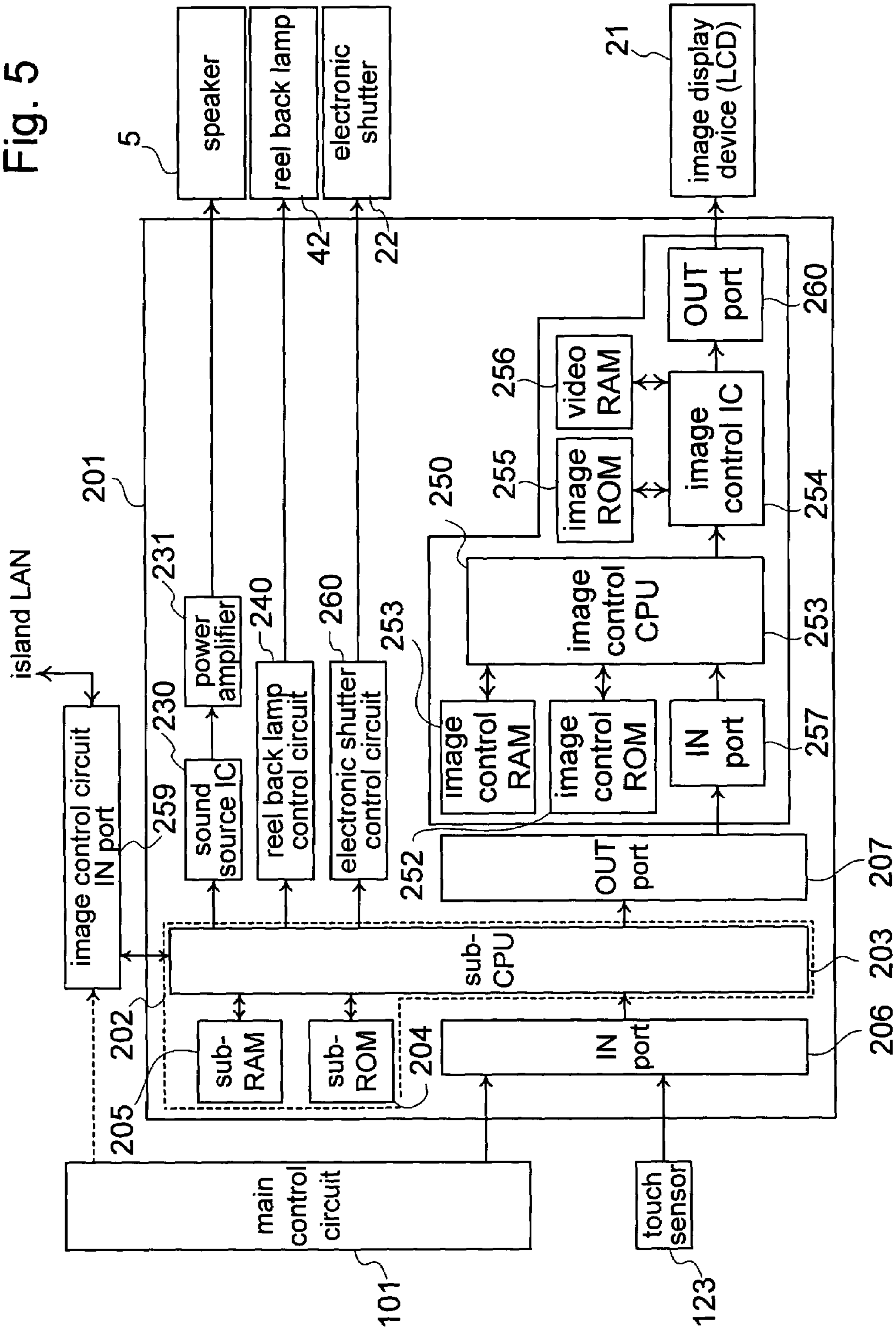
FIG. 5 is a block diagram showing a sub-control circuit.

The block diagram of FIG. 5 shows the configuration of sub-control circuit 201. Sub-control circuit 201 controls peripheral devices for effect such as image display unit 21, electronic shutter 22, speakers 5L and 5R, etc., based on game information from main control circuit 101 and input signals from a touch sensor 209 on the touch panel.

The sub-control circuit 201 is configured with a sub-microcomputer 202 as a main component and is composed of an image control circuit 250 for controlling the image display unit 21, a sound source IC 230 for controlling the output of sound from the speakers 5L and 5R, a power amp 231, serving as an amplifier, and a reel back lamp control circuit 240. These control circuits are configured on a circuit board other than that of the main control circuit.

The sub-microcomputer 202 comprises a sub-CPU 203, a sub-ROM 204, serving as storage means, and a sub-RAM 205. Like the main control circuit 101, sub-control circuit 201 in FIG. 5 comprises a clock pulse generating circuit, a frequency divider, a random number generator, and a sampling circuit although they are not shown in the FIG. 5. The sub-ROM 204 stores a communication sequence program for communication with main control circuit 101, an effect selection table for selecting various effects based on received game information, a sound sequence program, etc. The sub-RAM 205 is used as a working area for carrying out these control programs.

The sub-CPU 203 determines the effect to be carried out by various effect control circuits based on a game information command which is transmitted from main control circuit 101 and passes through an IN port 206. And The sub-CPU 203 sends the determined contents through an OUT port 207 to each effect control circuit.

The image control circuit 250 is composed with an image control CPU 251, an image control ROM 252, an image control RAM 253, an image ROM 255, a video RAM 256, and an image control IC 254. Image control CPU 251 receives parameters determined by sub-microcomputer 202 through an image control circuit IN port 257 and determines the contents to be displayed on the image display unit 21 in accordance with the image control sequence program stored in image control ROM 252. Image control ROM 252 stores a receiving sequence program for an image effect command transmitted from sub-microcomputer 202, an image control sequence program for controlling image control IC 254, etc. Image control RAM 253 is used as a working area for carrying out the image control program.

Image control IC 254 forms images corresponding to display contents determined by image control CPU 251 using graphic data stored in image ROM 255, stores the images in video RAM 256 temporarily, and outputs the images on the image display unit 21 at suitable timings via an image control circuit OUT port 258 to carry out display effects.

Reel back lamp control circuit 240 is used for effect display control such as winning effect and winning flag notification.

Figure 7:
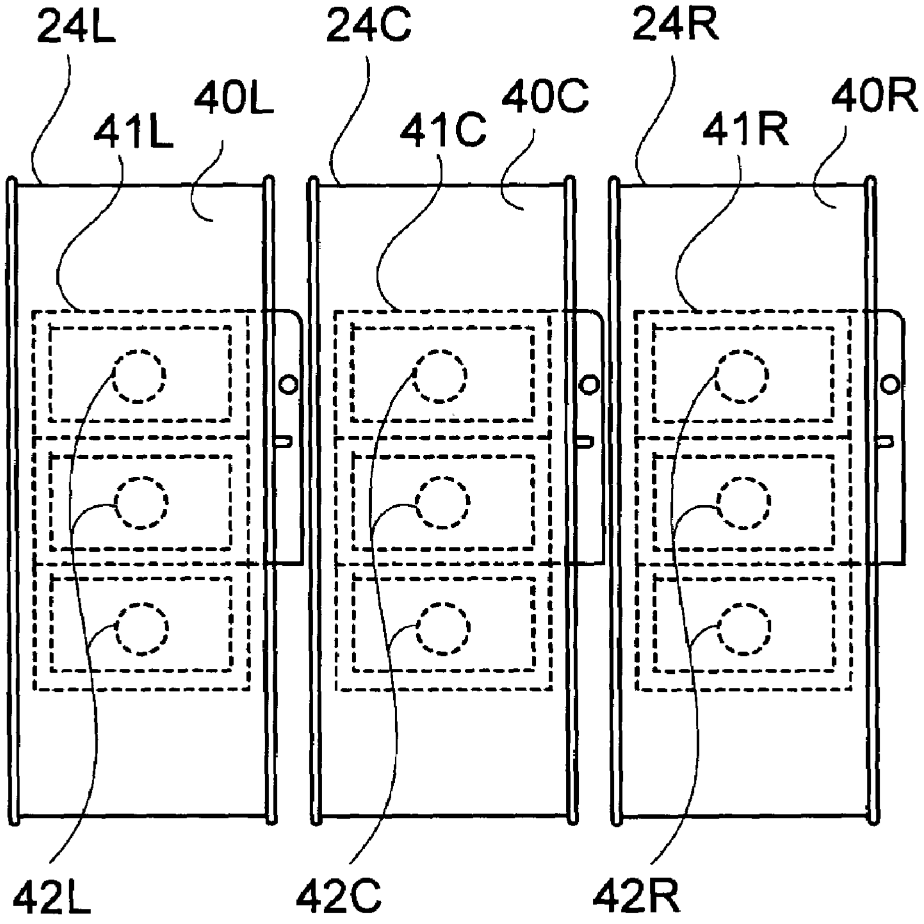
FIG. 7 is a diagram showing reels and back lamps.

FIG. 7 shows an enlarged view of the reels 24L, 24C, and 24R. Reel strips 40L, 40C, and 40R of reels 24L, 24C, and 24R are configured with a semi-translucent film material, and symbols such as "cherry," "7," or the like are printed on the surface with light transmissive inks. Regions other than the symbols are masked with light shielding inks. At the back of reel strips 40L, 40C, and 40R, lamp housings 41L, 41C, and 41R are provided in a manner such that lighting of each lamp will not interfere with other symbol regions. Reel back lamps 42L, 42C, and 42R are contained in the respective chambers of lamp housings 41L, 41C, and 41R. Reel back lamp control circuit 240 controls the blinking of reel back lamps 42L, 42C, and 42R based on parameters determined by sub-microcomputer 202. The winning symbol to be aimed at is suggested to a player, for example, by controlling the blinking of reel back lamps 42L, 42C, and 42R on the pay line when coins are paid out or preparing different blinking modes according to the internal winning combinations and executing an effect display when a winning flag is established.

An electronic shutter control circuit 260 performs transmissive/shielding control of electronic shutter 22, disposed between the image display unit 21 and reels 24L, 24C, and 24R, in accordance with whether or not voltage is applied, and by performing shielding control of the necessary display areas based on contents determined by sub-microcomputer 202, shields inner areas of the image display unit 21 that are designated as not being visually recognizable to a player. For example, when during Super Time (ST) game, which is a special gaming state in which an appropriate stopping order is notified in accordance with the selected stop table, start lever 13 is operated, control is performed so that only the display window 43 of the reel to be subject to the first stop operation is made visually recognizable and the display windows 43 of the reels are shielded to infallibly make a player recognize which reel is the reel that is to be subject to the first stop operation.

FIGS. 8A, 8B, and 8C show reel strips 40L, 40C, and 40R being developed on a flat surface. Each of the reels has 21 symbols. Each symbol has a symbol number from 1 to 21. These are stored in ROM 104 in the form of a symbol table. Symbol columns 40L', 40C', and 40R' are variably displayed in accompaniment to the rotation drive of reels 24L, 24C, and 24R in the order of the symbol number (ascending order).

FIG. 9 shows the number of coins to be paid out corresponding to the winning symbol combination (winning combination) in each gaming state.

The internal winning, and gaming states will now be explained. The internal winning is a state where a win is determined by collating a sampled random number with a winning probability table and the winning flag of the corresponding winning combination is set to on in the aforementioned probability lottery process.

The winning flag generally exists for all winning combinations. The winning combinations are categorized mainly into two combinations. One winning combination is a small winning combination, in which a winning flag cannot be carried over to the next game and a comparatively smaller payout number of coins are paid out. And the other winning combination is a winning combination for a bonus game such as a big bonus (BB) combination or regular bonus (RB) combination, in which the winning flag is carried over to the subsequent game until the winning is generated, the internal lottery probability of the winning combination is increased, and a large payout number of coins are paid out.

The small winning combination includes, for example, the "cherry" winning combination, which is won simply when a cherry symbol stops on an active line of the left reel, and the "bell" winning combination and "watermelon" winning combination, each of which is won when three symbols stop on the active line. The winning combination for the bonus game include big bonus and regular bonus combinations. The regular bonus (RB) is generated, for example, when "BAR-BAR-BAR" is aligned on an active pay line and pays out 15 coins first as the winning. It continues until a bonus game (of one coin bet called JAC game or pattern game) is played 12 times or the winning is generated eight times. A big bonus (BB) is generated when, for example, "red 7-red 7-red 7" are aligned on an active line. It pays out 15 coins first as the winning. During the BB, a game with a raised winning probability such as the small winning combination or the RB, which is called a general game, can be played up to 30 times. Further, during this period, the RB game can be played up to three times. Though RB is won from a general gaming state (or a common gaming state) when, for example, "BAR-BAR-BAR" become aligned, in the BB state, RB is won from a general gaming state when "Replay-Replay-Replay" become aligned. When a replay winning combination is won, the same number of coins as the loaded coins are inserted automatically. Therefore, a player can play a game without inserting coins in the next game. A single bonus (SB) is generated when, for example, "7 with sword-7 with sword-7 with sword" are aligned on an active line. It pays out 15 coins first when it is won. A JAC game can then be carried out once. Though the SB has the name of "bonus," a winning flag is not carried over. The winning flag is effective only in the current game as in the small winning combination.

Gaming states will now be explained. The gaming states can be roughly categorized into three states depending on the existence of a winning flag of the winning combination for the bonus game. They are a general gaming state, where no winning combination for the bonus game has been won internally yet, and a bonus internal winning state, where no winning has been generated because all winning symbols for the bonus game are not aligned on the active line (also referred to as "bonus internal winning" or "bonus internally hitting") though the internal winning in a probability lottery process has been achieved, and a bonus game state, where winning symbols have been aligned on the active line during the internal winning for a bonus game and the bonus game is being played (also referred to as "enabled bonus").

Furthermore, the internal winning for the bonus is categorized into a BB internal winning or an RB internal winning depending on the bonus type. The enabled bonus is categorized into either enabled BB or enabled RB.

Besides the winning combinations for the bonus games, there are other gaming states that are advantageous for a player and enable the player to obtain a large number of coins.

For example, there is a so-called "concentrated machine." A high probability table (for example, with an SB internal winning probability of 1/2) and a low probability table (for example, with an SB internal winning probability of 1/20) are prepared as the winning probability table for the SB during the general game. It is known a specific state is provided with the machine such that a lottery for switching to the high probability table (referred to as "plunge lottery") is carried out when the low probability table is used, or that a lottery for switching to the low probability table (generally referred to as "puncture lottery") is carried out when the high probability table is being used. Thus, the number of paid out coins is increased gradually when the high probability table is used.

In addition, a specific state called the "AT (assist time) function" is known. In this specific state, multiple winning combinations that can never be won at the same time are set (for example, the winning combinations, "bell-bell-red 7," "bell-bell-blue 7," and "bell-bell-white 7," are provided with intervals of four segments or more each being set among the symbols, "red 7," "blue 7," and "white 7" on the right reel). In a normal state, since the category of the internal winning combination is not notified and it is unknown which "7" is to be aimed at, a winning can theoretically be won only at a probability of 1/3 after internal winning. However, in the state called the "AT period," in which the internal winning category is notified, the category of the "7" symbol to be aimed is made known, and the theoretical probability of winning becomes 100% after internal winning as long as the observation push is accurate, and the coins thus increase gradually.

There is also an "Super Time (ST) function," in which stop control is carried out with no winning combination aligned unless the stopping operation is performed in a predetermined stop order for one internal winning combination even if the winning combination is internally won and the observation push is performed precisely. For example, as shown in FIG. 10, 6 types of stop order table from "NO.1" to "NO.6" are prepared, and when a bell is internally won in a probability lottery process, the stop table to be used is selected by random number lottery. And if, for example, in the current game, the stop table "NO.3" is selected, a winning is generated when middle stop button 15C, left stop button 15L and right reel stop button 15R are pressed in the first, second and third stop operation, respectively. For the other 5 types of stopping order, stop control is performed so that bell symbols will not be aligned on the active line even if the bell is won internally.

In a normal state, since this stop order is not notified, the probability of receiving a winning is theoretically only 1/6 after internal winning. However, in the state called the Super Time (ST) period in which the category of the selected stop table is notified. In other words, in the state that the order of the stopping operation should be notified, the theoretical probability of the winning becomes 100% after the internal winning so that the number of paid out coins is increase gradually.

As shown in FIG. 9, with the present embodiment, the number of coins paid out differs according to the gaming states even for the same winning symbol. For example, for a watermelon winning combination, whereas three coins are paid out in a general game or bonus internal winning state, 15 coins are paid out in a state of general game during BB. Though "Replay-Replay-Replay" is a replay winning symbol in a general game or bonus internal winning state, it is an RB winning symbol in a state of general game during BB, and in a JAC game state, it is a winning combination winning symbol that pays out 15 coins.

Furthermore, in this embodiment, the aforementioned "Super Time (ST)" is adopted as an advantageous status for a player other than a winning combination for a bonus game and arrangements are made so that Super Time (ST) game is activated when predetermined conditions are fulfilled during a general gaming state. Specifically, when the SB winning combination or the bell winning combination is won internally, the information on the order of stopping required for aligning the winning combination of symbols for winning is notified to a player. Therefore, when the SB winning combination or bell winning combination is won internally during the period of this specific state, the player can definitely generate a win without generating missed winning by performing operations in accordance with the notified order of stopping.

FIG. 11 is a diagram showing a winning probability table used in the aforementioned probability lottery process. A random number is picked up from the range of "0 to 16383." If the random number belongs to a winning range specified for each winning combination, the related winning combination is won internally. For example, if the random number picked up in the current game is "10000," since this belongs to the winning range "2299 " to "11024 " of the bell winning combination, the bell winning combination is won internally. If the random number picked up in the current game is "15000," since this belongs to the loss range of "13669 to 16383," no winning combination is won internally and the result is a loss.

FIGS. 12A, 12B, and 12C show three tables of game information commands provided from main control circuit 101. In this embodiment, main control circuit 101, which controls winning determination and coin payout, and sub-control circuit 201, which controls the image display unit 21 and speakers 5L and 5R, are configured on separate boards. Since game information on the internal winning states of winning combinations and reel stop statuses, which are processed in the main control circuit, are required for the effect control processed by sub-control circuit 201, the two boards are connected to each other with a straight cable for sequentially sending the required information. The sent commands include a "start command," which is sent when a player operates the start lever 13, a "reel stop command," which is sent when stop button 15L, 15C, or 15R is operated to stop rotating reel 24L, 24C, or 24R, and a "1 game completion command," which is sent when one game is fully completed.

Each command denotes a single type of data with two bytes. The first byte denotes a command type and the last byte denotes a command content. The start command is arranged as six-byte data. The start command is composed of three data types: "internal winning combination," "gaming state," and "selected stop table." The reel stop command for one time stop operation is arranged as four-byte data. The reel stop command is composed of two data types: "stop order" and "stop reel." The one-game-completion command is arranged as four-byte data. The one-game-completion command is composed of two data types: "winning category" and "bonus game state."

Figure 13A:
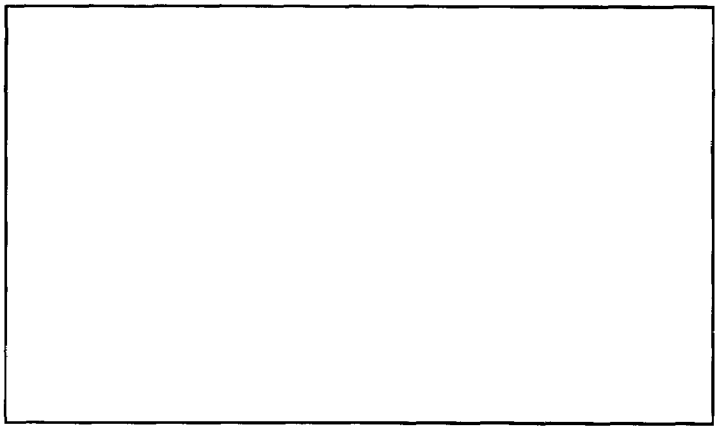
FIG. 13A shows an enlarged and simplified view of the panel display unit.
Figure 13B:
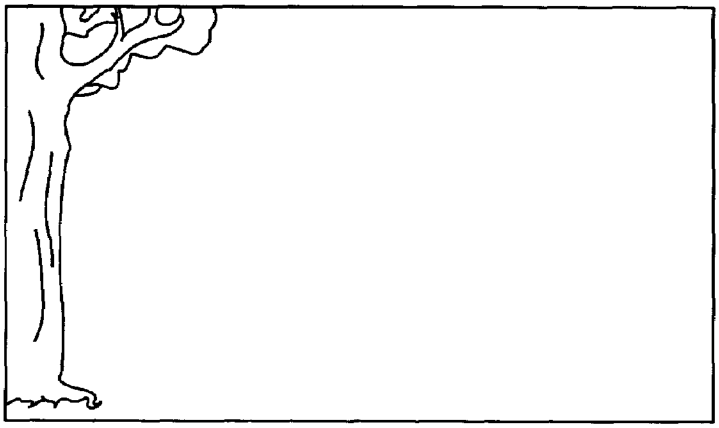
FIG. 13B shows an enlarged view of a sheet.
Figure 13C:
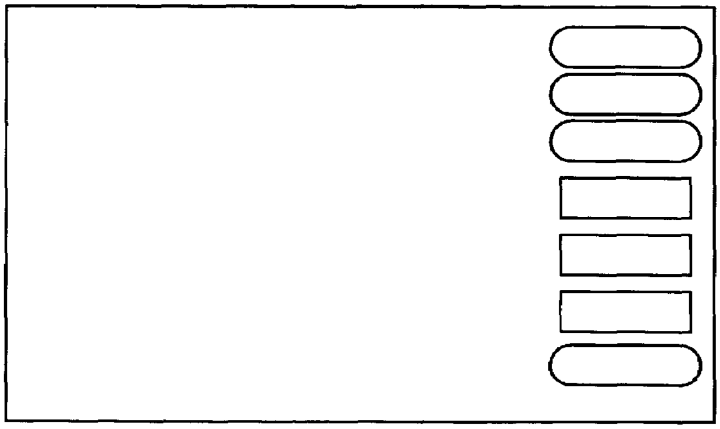
FIG. 13C shows an enlarged view of an electronic shutter.

FIG. 13A shows a front view of panel display unit 7. The panel display unit 7 is composed of a single plate that is formed of a transparent acrylic plate and plays the role of protection against physical impact from the exterior. FIG. 13B shows a front view of a picture sheet 20. With the picture sheet 20, a first design is printed with semi-translucent ink on a transparent film material, and with the present embodiment, a tree design 20*a* as the first design is printed at the left side of the sheet. FIG. 13C shows a front view of electronic shutter 22. Electronic shutter 22 is composed of a liquid crystal film and switching between transparent and non-transparent states is performed in accordance with voltage application states. With the display area for the lamp parts and seven-segment display areas at the right side of the electronic shutter, the transparent state is maintained regardless of whether or not voltage is applied and is thus arranged to be visually recognizable by a player at all times.

Figure 14:
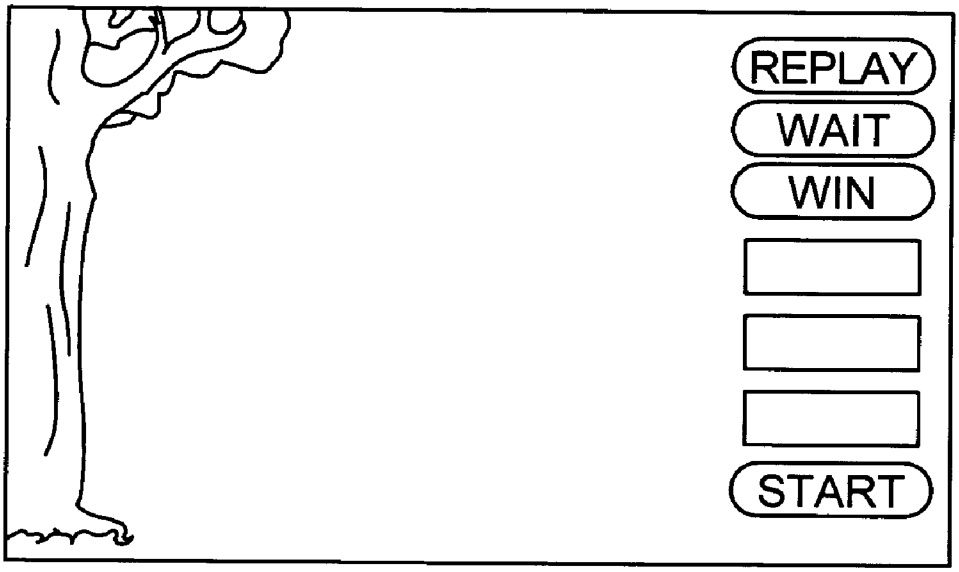
FIG. 14 is an enlarged view of the panel display unit.

FIG. 14 is an enlarged view of panel display unit 7 in a state in which electronic shutter 22 is in the shielding state (non-voltage-applied state) over the entire area. This display state is, for example, displayed when the power of pachi-slot machine 1 is not on, and whereas reels 24 are hidden by electronic shutter 22 and are not visually recognizable by a player, the picture sheet 20, due to being provided in front (at the player side) of electronic shutter 22, is not affected by the control state of the electronic shutter and is visually recognizable by a player. Also, the various lamp display areas and seven-segment display areas at the right side of the panel display unit are positioned at an inner part of the casing from the electronic shutter 22. The various lamp display areas and seven-segment display areas are visually recognizable to the player since the display area of the electronic shutter 22 is in a transparent state.

Figure 15A:
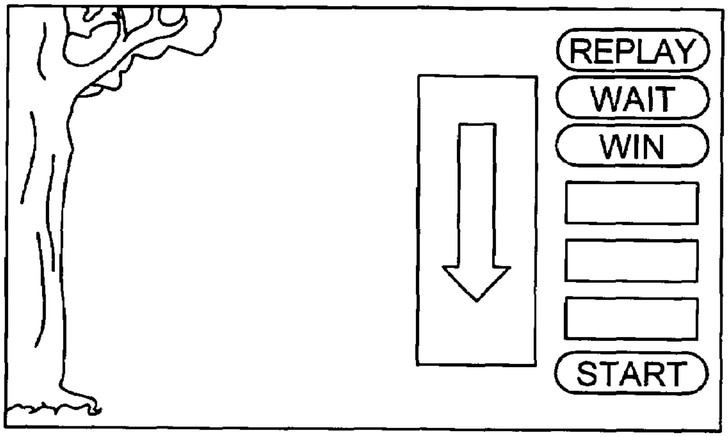
FIG. 15A shows the panel display unit prior to the first stop operation during Super Time (ST) game.
Figure 15B:
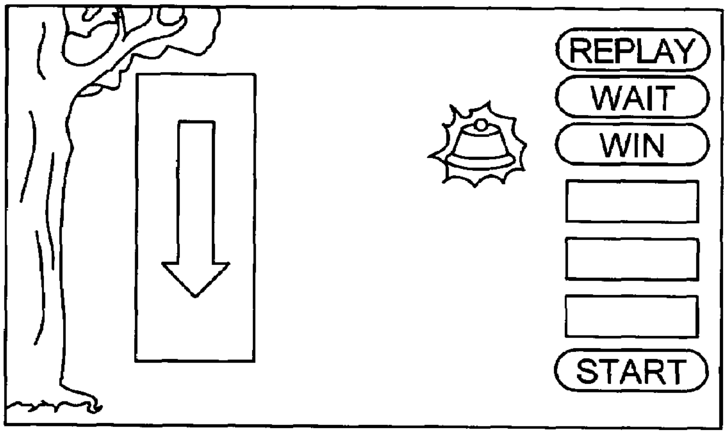
FIG. 15B shows the panel display unit after a right stop button is operated by the player during Super Time (ST) game.
Figure 15C:
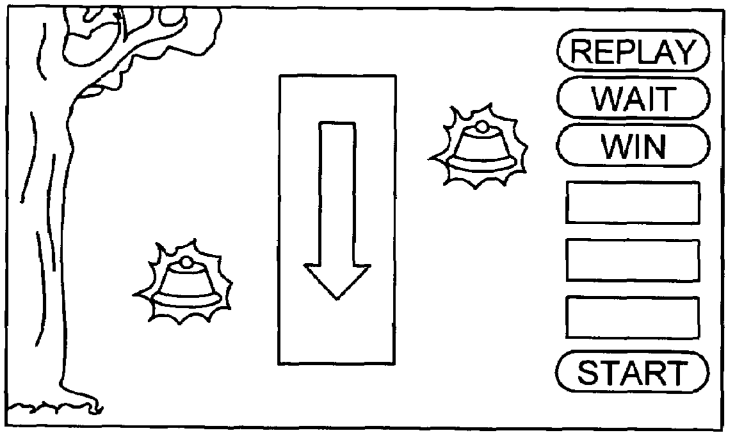
FIG. 15C shows the panel display unit after a left stop button is operated by the player during Super Time (ST) game.

FIGS. 15A, 15B, and 15C show diagrams of effect screens during the Super Time (ST) game, which is a special gaming state. FIG. 15A is a diagram showing, as an example of effect control during Super Time (ST) game, the display that is displayed on panel display unit 7 prior to the first stop operation when a bell is internally won and stop table No. 5 in FIG. 10 has been selected in the current game. With the present embodiment, for effect control during Super Time (ST) game, electronic shutter 22 is subject to transmissive control only at the display area of the reel corresponding to the stop button which is to be operated for stopping, and the other display areas are subject to shielding control in order to indicate the appropriate stopping operation. Since with stop table No. 5, the first stop operation is the operation of the right stop button, the display areas besides that of right reel 24R are shielded and only the rotating right reel 24R is made visually recognizable to a player in order to indicate to the player that right stop button 15R should be operated for stopping. Here, transmissive control refers to controlling the electronic shutter so that the reel symbol at the rear is made visually recognizable, and as long as the reel symbol is visually recognizable by the player, the electronic shutter does not have to be in a completely transparent state and may be in a semi-transparent state or a colored state. Likewise, the shielding state is not limited to a state in which light is completely blocked and a somewhat semi-transparent state can also be included in the scope of the present invention as long as the reel symbol at the rear is not visually recognizable.

FIG. 15B is a diagram showing panel display unit 7 when a player has operated right stop button 15R for stopping in the state of FIG. 15A. Since first stop operation by the right stop button is the valid stop operation, with the display area of right reel 24R, in which the entirety of right reel 24R in rotation was visually recognizable in FIG. 15A, just the bell symbol, which is the internal winning combination, is made visually recognizable and the other parts of the display area are shielded to notify the player that the stop operation is correct. Also, the display area of left reel 24L, which was shielded in FIG. 15A, is put in a transmissive state and left reel 24L in rotation is made visually recognizable to indicate to the player that operation concerning left reel 24L should be performed.

FIG. 15C is a diagram showing panel display unit 7 when a player has operated left stop button 15L for stopping in the state of FIG. 15B. Since second stop operation by the left stop button is the valid stop operation, with the display area of left reel 24L, in which the entirety of left reel 24L in rotation was visually recognizable in FIG. 15B, just the bell symbol, which is the internal winning combination, is made visually recognizable and the other parts of the display area are shielded to notify the player that the stop operation is correct. Also, the display area of middle reel 24C, which was shielded in FIG. 15B, is put in a transmissive state and middle reel 24C in rotation is made visually recognizable to indicate to the player that operation concerning the remaining middle reel 24C should be performed.

Figure 16A:
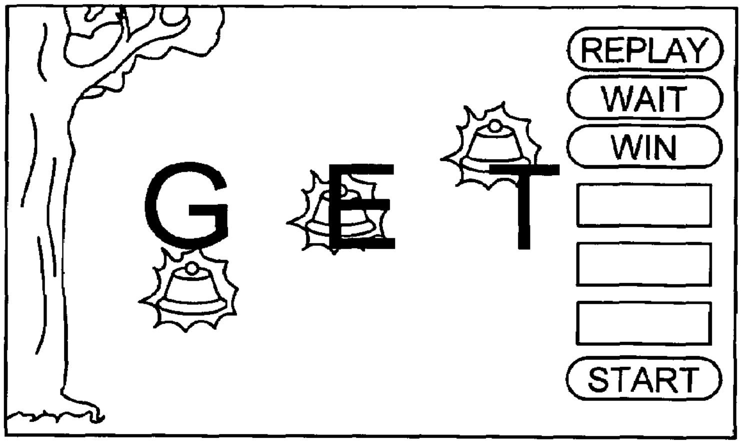
FIG. 16A shows the panel display unit at the winning after all stop operations are completed during Super Time (ST) game.

FIG. 16A is a diagram showing panel display unit 7 when all stopping operations during Super Time (ST) game have been performed correctly and a win has been achieved. In FIG. 16A, the electronic shutter is subject to transmitting control just at the parts of the bell symbols, which make up the winning combination, and the bell symbols on reels 24 are made visually recognizable, and the characters, "GET," are displayed on the image display unit 21 to notify the player that bells have been won.

Figure 16B:
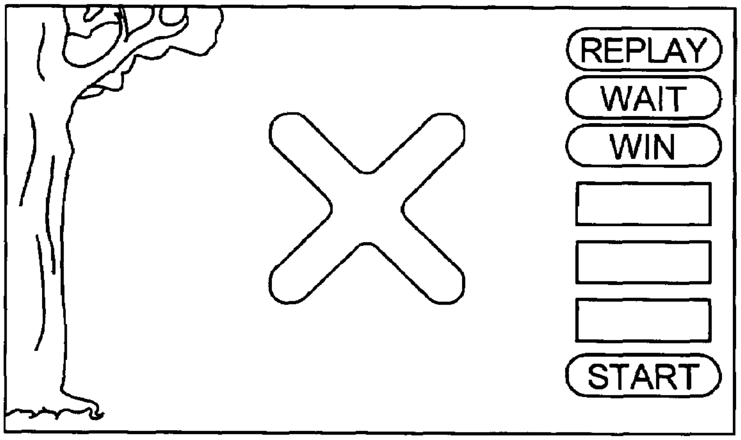
FIG. 16B shows the panel display unit when the winning is missed due to erroneous stop operations during Super Time (ST) game.

FIG. 16B is a diagram showing panel display unit 7 for a case where missed winning occurred due to erroneous stopping operation during Super Time (ST) game. This is displayed when, for example, in the state of FIG. 15B, middle stop button 15C is operated when the correct operation was to operate left stop button 15L, and a large "x" is displayed at the center of the display area to notify the player that the stopping operation was wrong.

Figure 16C:
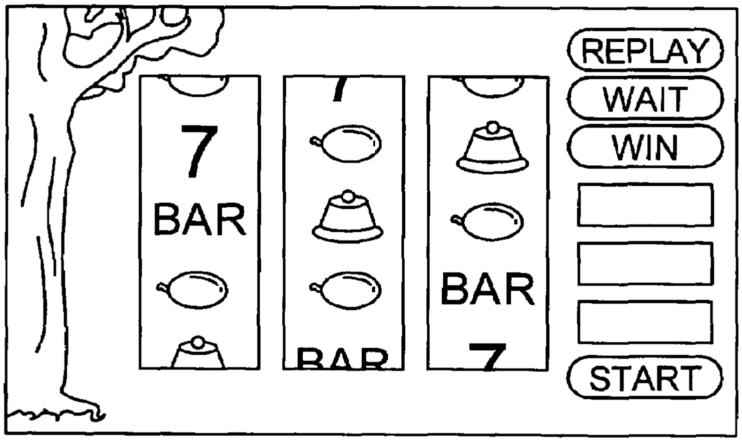
FIG. 16C shows the panel display unit when all shielding areas are shielded during Super Time (ST) game.

After display by the effect control executed as shown in FIG. 16A or 16B is performed for a fixed period of time, all shielded areas are subject to transmitting control as shown in FIG. 16C and the effect control for one game is thereby ended.

Figure 17A:
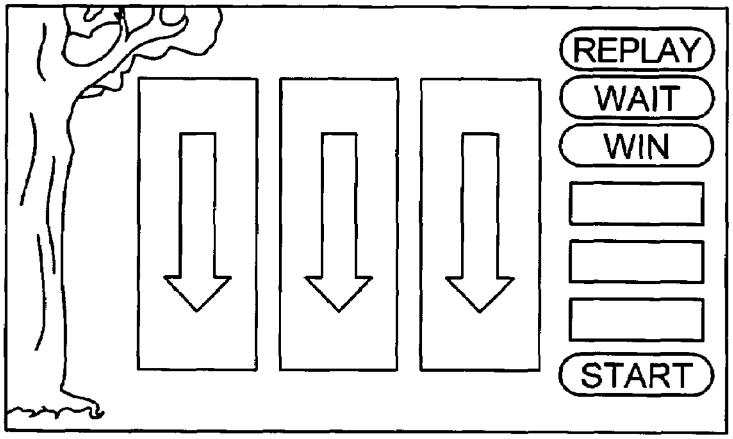
FIG. 17A shows the panel display unit when the reels are rotating during an effect preview.
Figure 17B:
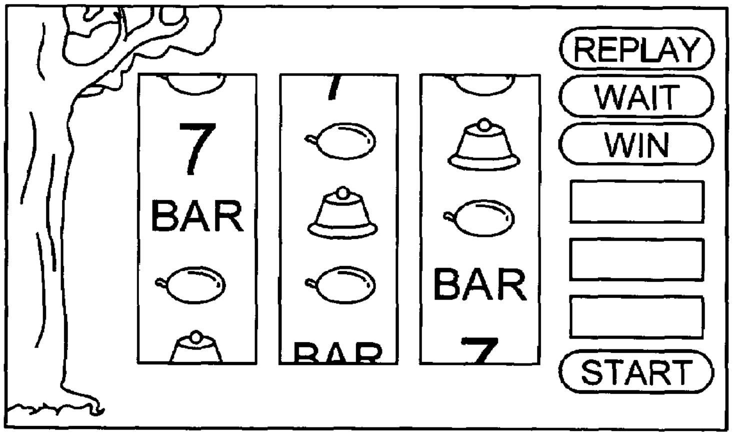
FIG. 17B shows the panel display unit when the reels are stopped during the effect preview.
Figure 17C:
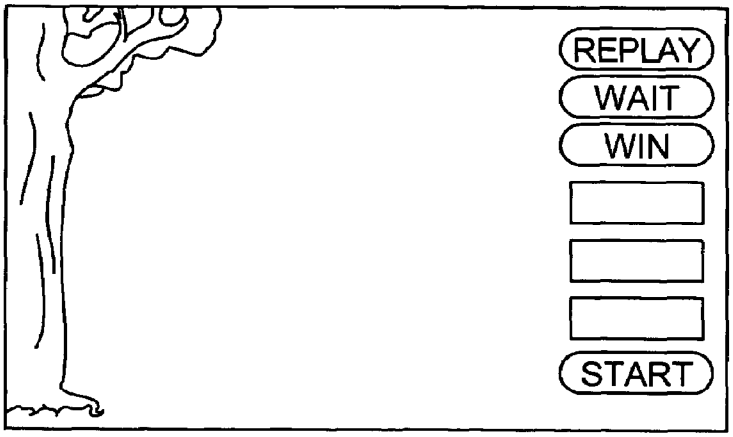
FIG. 17C shows the panel display unit when the shutter shields a view of the reels during the effect preview.

FIGS. 17A, 17B, and 17C show notification effect screens that are generated at a predetermined probability after all reels 24L, 24C, and 24R have stopped. With regard to the specific flow of the effect, first, the reels 24L, 24C, and 24R in rotation are displayed through panel display unit 7 (FIG. 17A), and thereafter, all reels are stopped by the stopping operation by a player (FIG. 17B). After all reels have stopped, electronic shutter 22 is put in the shielded state so that reels 24L, 24C, and 24R, which were displayed, become hidden behind the electronic shutter as shown in FIG. 17C.

Next, a notification effect based on the internal winning combination of the current game is executed. With the notification effect of the present embodiment, the reliability of establishment of a winning combination for a bonus game is expressed by the degree of matching of the display positions of bell symbols displayed on the image display unit 21 and the stop positions of the bell symbols of reels 24L, 24C, and 24R, which are displayed in the stopped state. FIG. 19A shows an notification effect generation table. The notification effect generation table is referenced when, in a case where BB, RB, watermelon, or SB is internally won, the lottery for determining whether or not to execute a notification effect is executed. For example, whereas an effect is executed in the current game if a watermelon is internally won and the random number for effect selection is 15, an effect will not be executed even if the random number for effect selection is 15 if the internal winning combination is SB.

FIG. 19B is a diagram showing the effect category selection table. When the execution of a notification effect is determined by the notification effect generation table, the effect category selection table is referenced to determine the contents of the effect. Effects are categorized according to how precisely the bell symbol stop positions on the image display unit 21 are to be matched to the bell symbol stop positions of reels 24L, 24C, and 24R, and the higher the degree of matching, the higher the probability that a winning combination for a bonus game is an internal winning combination. For example, in the Figure, "All" in the "number of bells displayed" column indicates that all of the display positions of both parts are matched and "Number appearing-2" indicates that a maximum of two of the display positions of both parts are unmatched. For example, if in the current game, the internal winning combination is "SB" and the random number for effect selection is 118, the effect corresponding to "Number appearing-4" is selected. In this case, if, for example, there are only two bell symbols that are displayed in the stopped state on reels 24L, 24C, and 24R, an effect mode with which all display positions are unmatched is selected, and if, for example, five bell symbols are displayed, display is performed with four of the display positions being unmatched and one display position being matched.

Figure 18A:
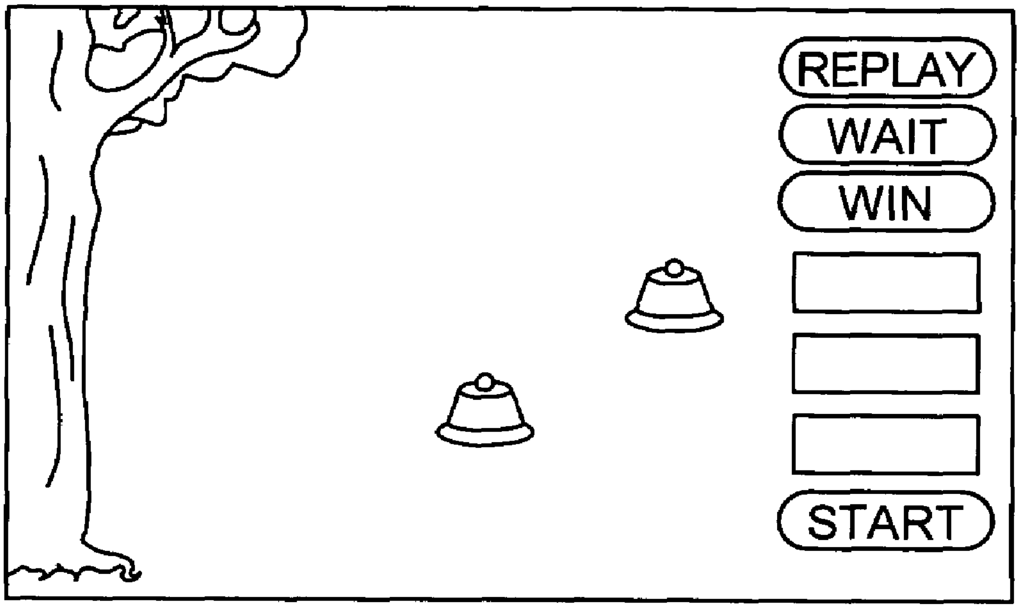
FIG. 18A shows the panel display unit when the reels are stopped in a mode during the effect preview.
Figure 18B:
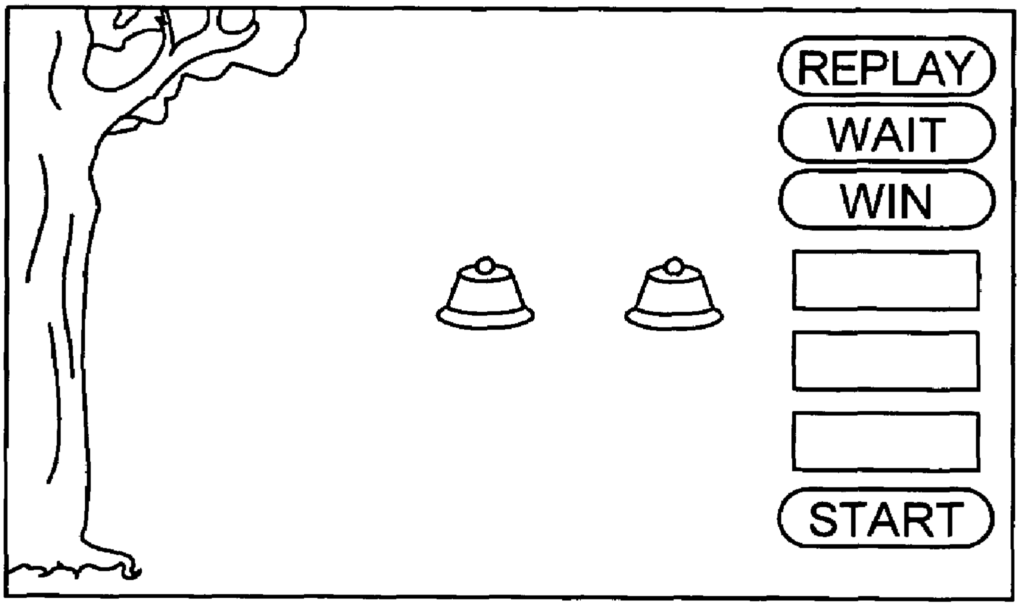
FIG. 18B shows the panel display unit when the reels are stopped in another mode during the effect preview.

FIGS. 18A and 18B show diagrams of specific examples of notification effect modes. FIG. 18A shows the display that is displayed when, in the case where reels 24L, 24C, and 24R are stopped in the display mode of FIG. 17B, any of "Number appearing-2," "Number appearing-3," "Number appearing-4," and "Number appearing-5," is selected from the effect category selection table of FIG. 19B. Though with regard to the symbols displayed on the reels in the reel stopped state of FIG. 17B, bell symbols are displayed at the middle stage of middle reel 24C and the upper stage of right reel 24R, on the image display unit 21, bell symbols are displayed at the lower stage of the middle reel and the middle stage of the right reel, and since the display positions of both parts are not matched, it can be understood that the notification effect is one that indicates low reliability.

FIG. 18B shows a display that is displayed when, in the case where reels 24L, 24C, and 24R are stopped in the display mode of FIG. 17B, "Number appearing-1" is selected from the effect category selection table of FIG. 19B. With regard to the symbols displayed on the reels, bell symbols are displayed at the middle stage of middle reel 24C and the upper stage of right reel 24R, and on the image display unit 21, bell symbols are displayed at the middle stage of the middle reel and the middle stage of the right reel. Though the display position is mismatched with regard to right reel 24R, since the display position is matched for middle reel 24C, it can be understood that the notification effect is one that indicates high reliability.

FIG. 20 is a diagram showing a BR generation and BR continuing number lottery table. With the present embodiment, whether or not a BR is to be made to occur and the number of times BR is to be continued are determined by lottery at a fixed probability when a predetermined winning combination is internally won. In this table, a BR is made to occur at a probability of 16/128 when a watermelon is internally won, at a probability of 11/128 when two cherries are internally won, and at a probability of 25/128 in the case of missed winning.

Figure 21:
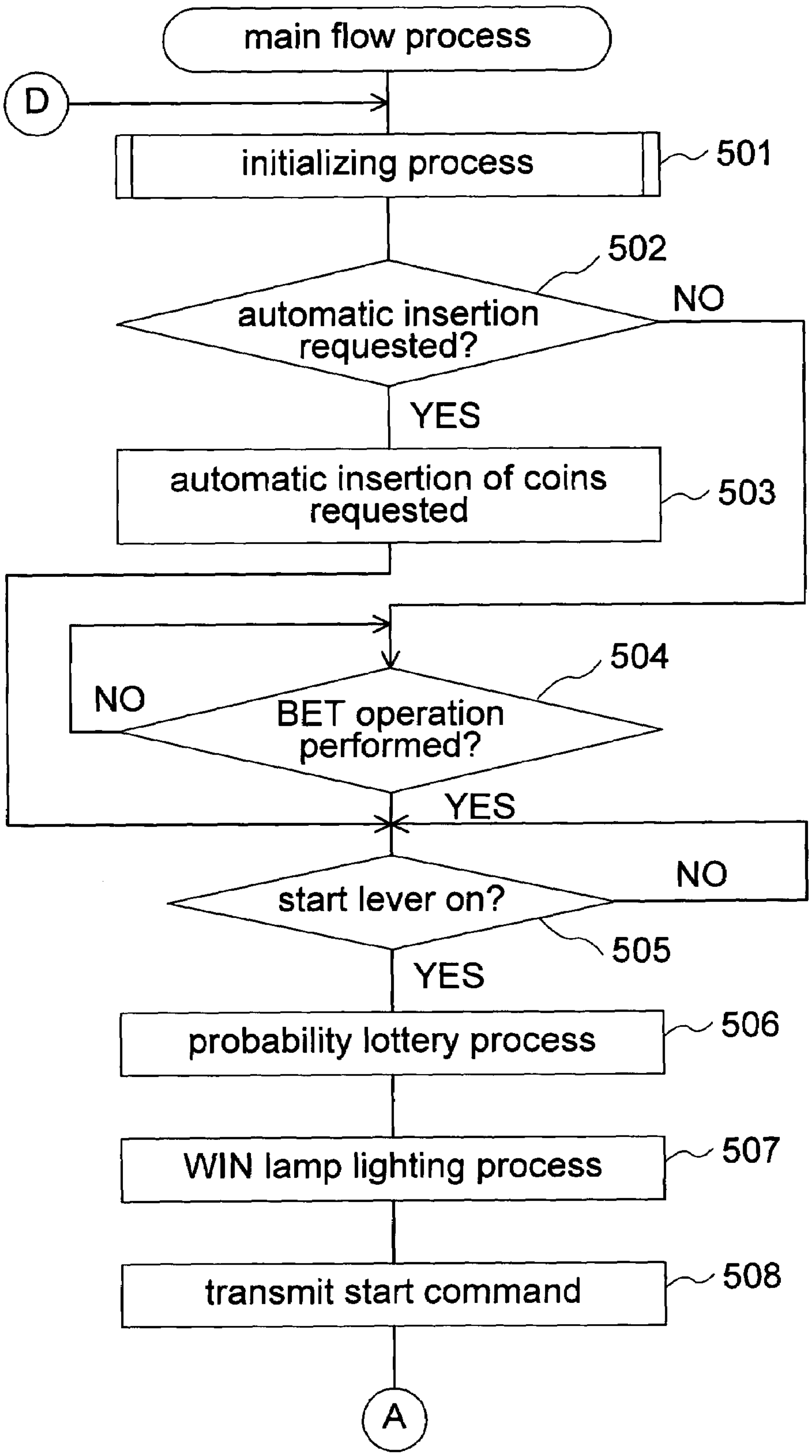
FIG. 21 is a flowchart showing a process of the main control circuit.
Figure 22:
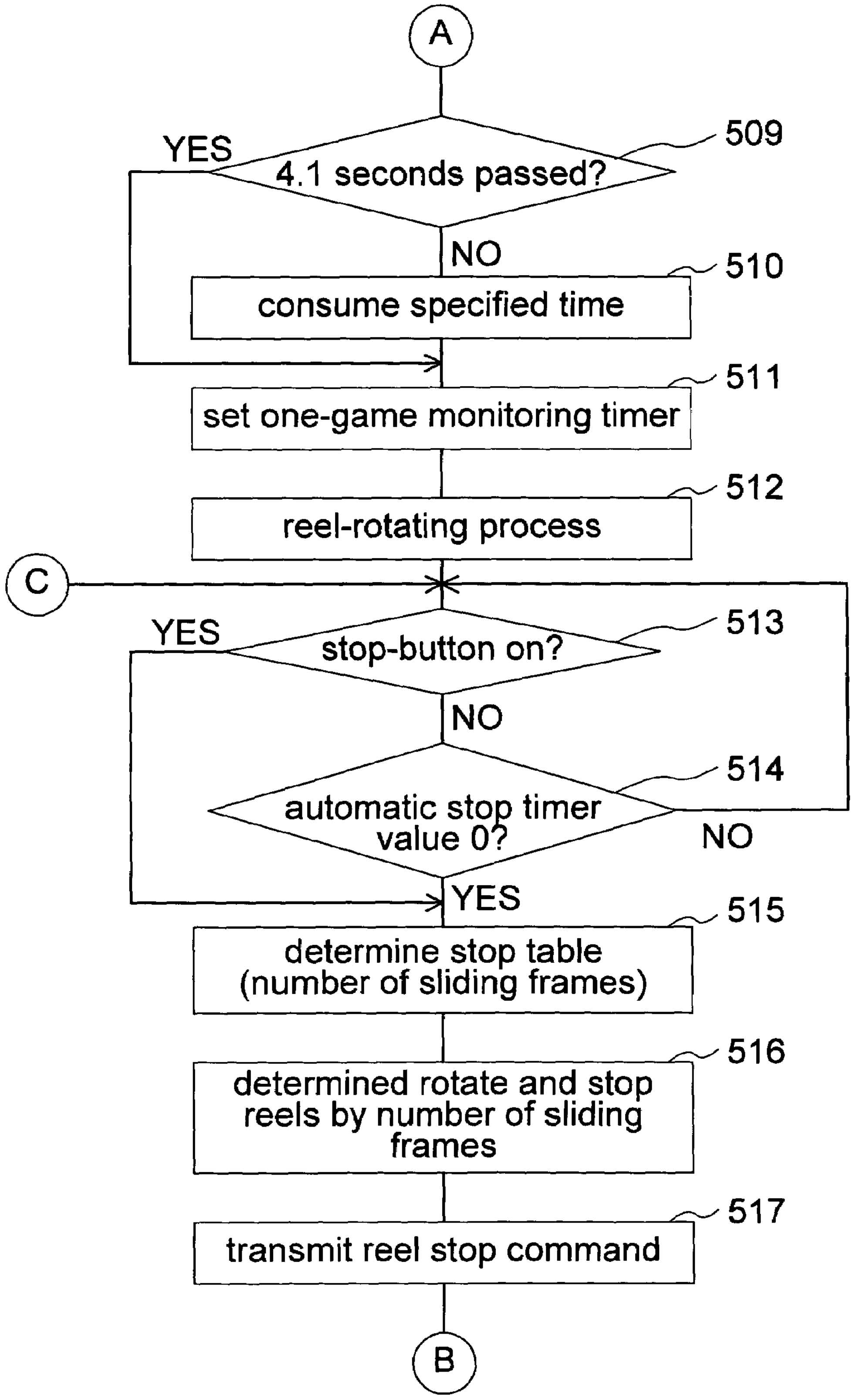
FIG. 22 is a flowchart showing a process of the main control circuit.
Figure 23:
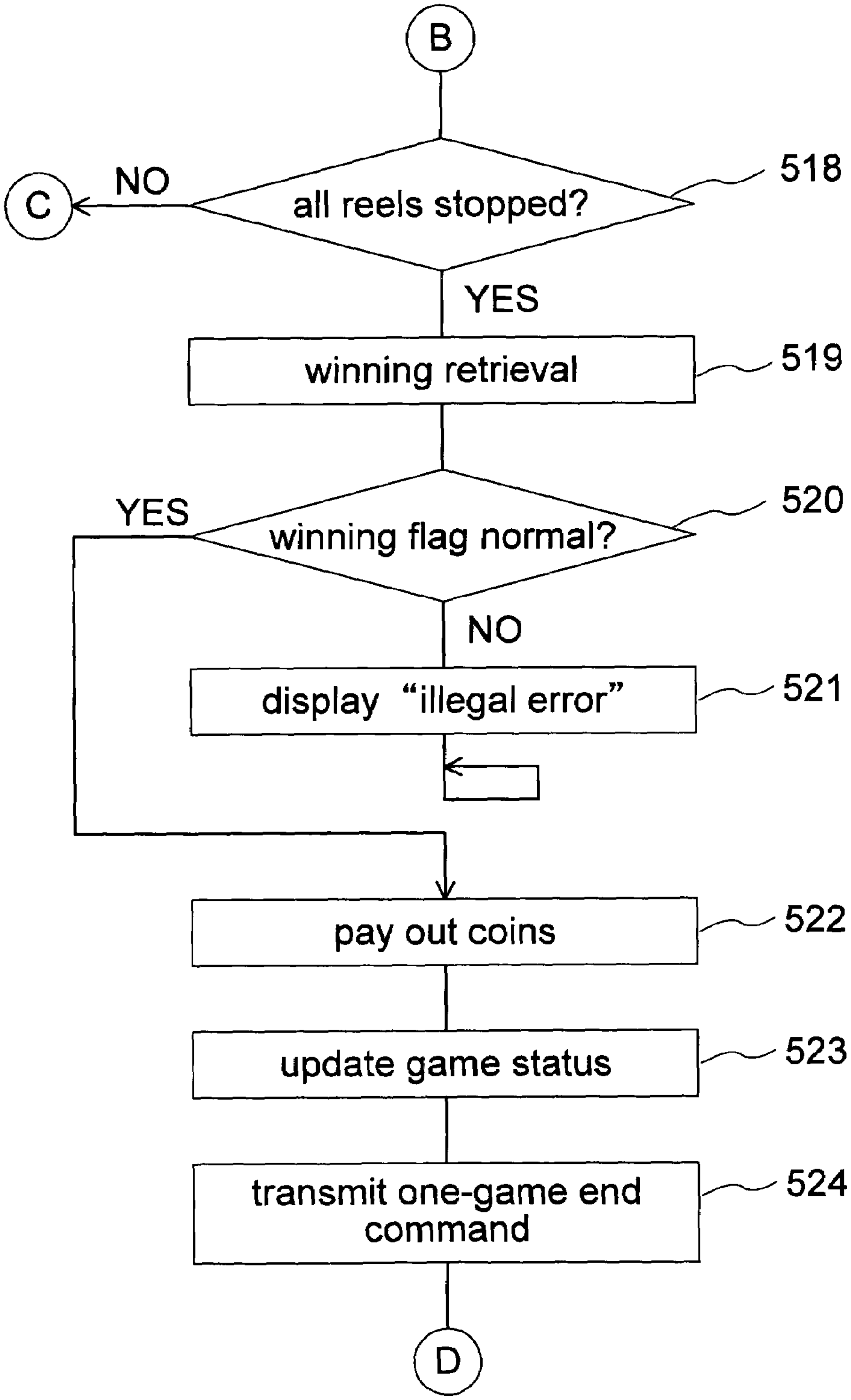
FIG. 23 is a flowchart showing a process of the main control circuit.

The control operations of main control circuit 101 and CPU 103 will now be explained with reference to the main flowchart shown in FIG. 21 through FIG. 23.

First, CPU 103 carries out an initialization process before starting a game (step 501, referred to as ST hereinafter). Specifically, the previous game status and communication data stored in RAM 105 are cleared, the game parameters required for a game are written, the start address of the sequence program is set, etc.

CPU 103 then determines whether or not there is an automatic coin insertion request, in other words, determines whether there was a replay winning in the previous game (ST 502). If determined as "YES," the requested number of coins are loaded automatically (ST 503) and a transfer to the process of ST 505 is carried out. If determined as "NO" at ST 302, whether or not new coins were inserted, in other words, whether or not there is an input from the inlet coin sensor 117 due to coins being loaded into coin insertion slot 11 by a player and whether or not there is an input by the operation of any of the various BET switches 8, 9, and 10 are determined (ST 504). If determined as "YES," a transfer to ST 305 is performed while if determined as "NO," the input signal is monitored until a BET operation is executed.

CPU 103 then determines whether or not there is an input due to the operation of start lever 13 (ST 505). If determined as "YES," a transfer to ST 506 is performed, and if determined as "NO," the input signals are monitored until the start lever is operated.

Next, the probability lottery process is carried out (ST 506). In the probability lottery process, first, a random number for lottery is picked up from the range of "0 to 16383 " using random number generator 108 and sampling circuit 109. Then using the winning probability table (FIG. 11) that sets a random number range (winning range) in accordance with the gaming state and number of medals input, the winning range to which the picked-up random number belongs is determined and the corresponding internal winning combination (winning flag) is determined.

Next, if a winning combination for a bonus game was won internally, a WIN lamp lighting process of lighting up the WIN lamp at a predetermined probability is performed (ST 507).

The game information of main control circuit 101 at the start of the game is then sent to the sub-control circuit (ST 508). For a transmitted command, such as the "start command" among the game information commands in FIGS. 12A, 12B, and 12C, the winning flag determined by the above-mentioned probability lottery process, the current gaming state, the stop table number determined according to the winning flag, etc., are sent.

Next, it is determined, whether or not a predetermined time, for example 4.1 sec, has passed since the one game monitoring timer was set in the previous game (ST 509). If determined as "YES," the one game monitoring timer for the following game is set (ST 511). If determined as "NO," the elapse of the remainder of the predetermined time is awaited (ST 510) and then the one game monitoring timer is set for the following game (ST 511).

Next, CPU 103 controls motor drive circuit 111 and carries out a process of rotating reels 24L, 24C, and 24R (reel rotation process) (ST 512). In the reel rotation process, an acceleration process is carried out starting from the state where the reels 24L, 24C, and 24R are stopped and a constant-speed rotation process is carried out after a predetermined speed is reached. Under this constant-speed rotation state, the stop buttons 15L, 15C, and 15R are activated to enable stop operation of the reels 24L, 24C, and 24R.

Next, CPU 103 determines whether any of stop buttons 15L, 15C, and 15R was operated (whether or not a stop button is on), in other words, whether or not a stop signal has been sent from reel stop signals circuit 118 upon operation of any of the stop buttons 15L, 15C, and 15R by a player (ST 513). If determined as "YES,", a transfer to ST 515 is performed while if determined as "NO," a transfer to the process of ST 514 is performed. In the process of ST 514, whether or not the value of the automatic stop timer is "0 " is determined. "Automatic stop" refers to a process in which the reels 24L, 24C, and 24R are stopped automatically after the elapse of a predetermined period of time (for example, 40 seconds) from the point at which the reels started rotating even if stop buttons 15L, 15C, and 15R have not been pushed and the reels are rotating. If determined as "YES," in other words, if the value of the automatic stop timer is "0," a transfer to ST 515 is performed in order to automatically stop the reels, and if determined as "NO," a transfer to the process of ST 513 is carried out in order to continue monitoring the reception of stop operations.

In the process of ST 515, CPU 103 carries out a "slip segment number determination process." In the "slip segment number determination process," the slip segment number of the reel corresponding to the stop button that was subject to a stop operation is determined. Here, "slip segment number" refers to the number of symbols (number of segments) to be slipped before stopping the reel (the actual stop position is called "stop position") from the symbol position (referred to as the "stop operation position") that is displayed in display window 43L, 43C, or 43R when stop button 15L, 15C, or 15R is pushed.

Next, the CPU 103 controls motor drive circuit 111 so that the reel corresponding to the stop button that was subject to a stop operation is stopped after rotating by the determined number of slip segments (ST 516).

Next, the CPU 103 transmits to the sub-control circuit 201 a "reel stop command," which indicates that the reel has been stopped (ST 517). As indicated in the "reel stop command" of the game information command, the reel stop command transmits the stop order status (the number of the current stop operation) and the stop reel status (the reel subject to the stop operation) to the sub-control circuit 201.

Next, the CPU 103 determines whether or not all reels have stopped. If determined as "YES," a transfer to ST 519 is carried out. If determined as "NO," since this means that there remain some rotating reels, a transfer to ST 513 is carried out.

Next, CPU103 carries out a winning search process (ST 519). In this winning search process, it is determined whether not the mode of stoppage of the symbols displayed in display windows 43L, 43C, and 43R denotes an established winning. If this stop mode denotes an established winning, the winning flag of the corresponding winning combination is stored in RAM 105. Specifically, the determination is made by collating the code numbers of the symbols on center line L1 with the winning symbol combination table stored in ROM 104.

The winning flag and the winning flag are then compared to see whether or not they match and thereby determine whether or not the current win is normal (ST 520). If determined as "NO," an "illegal error" is displayed and the execution of the game program is interrupted. If determined as "YES" in ST 520, coins are paid out in accordance with the established winning combination type and gaming state (ST 522).

If the gaming state is changed by completing the current game, a transition process is carried out (ST 523). This process is carried out, for example, when the final winning in the bonus game has been achieved, when a bonus is internally won in the current game, or when the symbols "7-7-7 " stop on the active line and the bonus game is started.

Next, the category of the established winning combination, the gaming state, etc., are sent to the sub-control circuit in the form of a "1 game completion command" as shown in the game information command tables of FIGS. 12A-12C (ST 524).

The control operation of sub-CPU 203 of sub-control circuit 201 will now be described.

Figure 24:
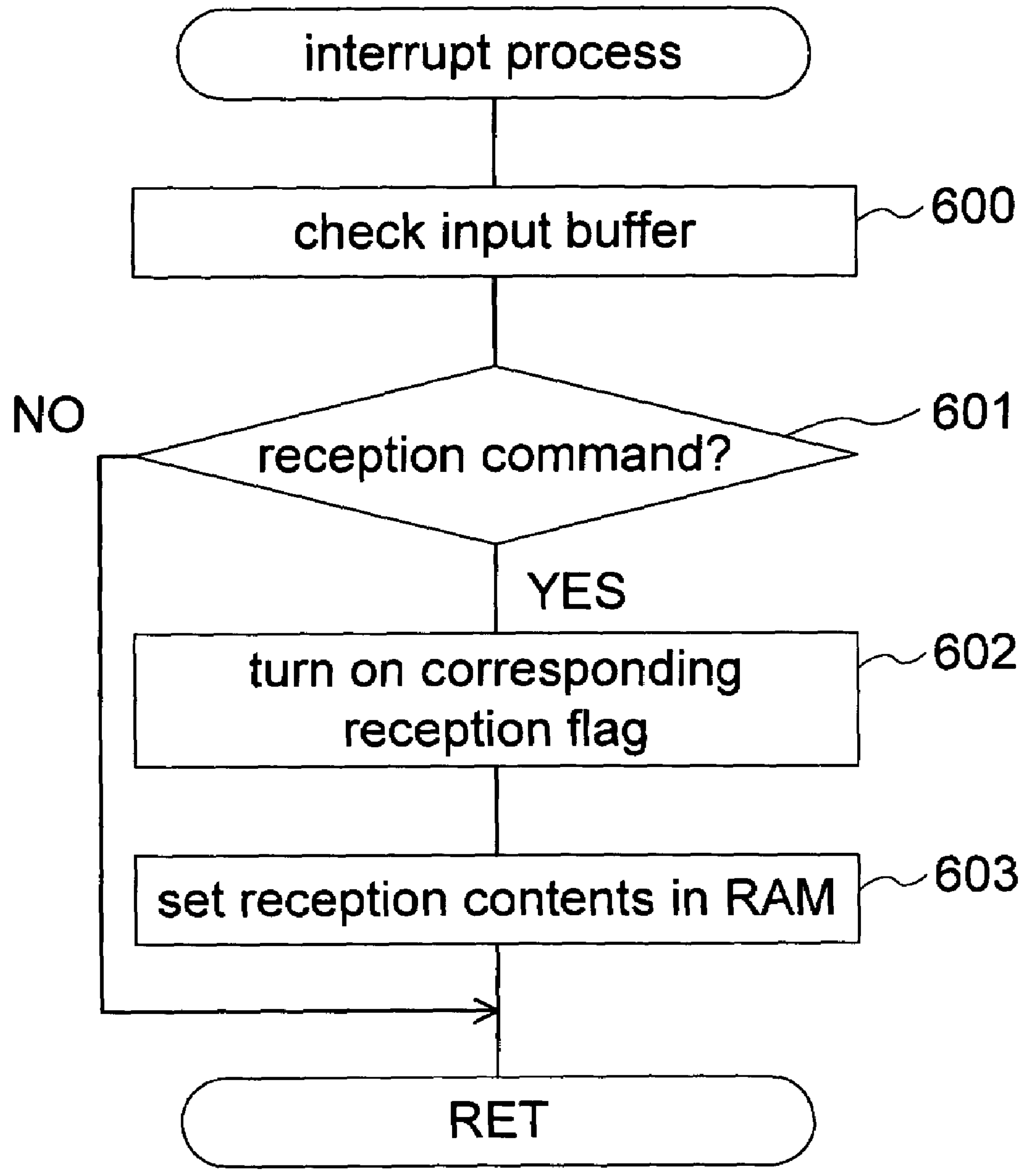
FIG. 24 is a flowchart showing an "interrupt process 1."

FIG. 24 shows a flowchart of an interrupt process 1. This interrupt process 1 is executed as an interrupt process every 3 ms, and in this process, the game information commands sent from main control circuit 101 and input signals from the touch panel are stored in sub-RAM 205.

First, sub-CPU 203 checks the input buffer (ST 600) and determines whether or not there is an input signal in the input buffer (ST 601). If determined as "YES," a receiving flag is turned on (ST 602), the contents of the received command are set in sub-RAM 205 (ST 603), and the process is completed. If determined as "NO," the process is completed as it is.

Figure 25:
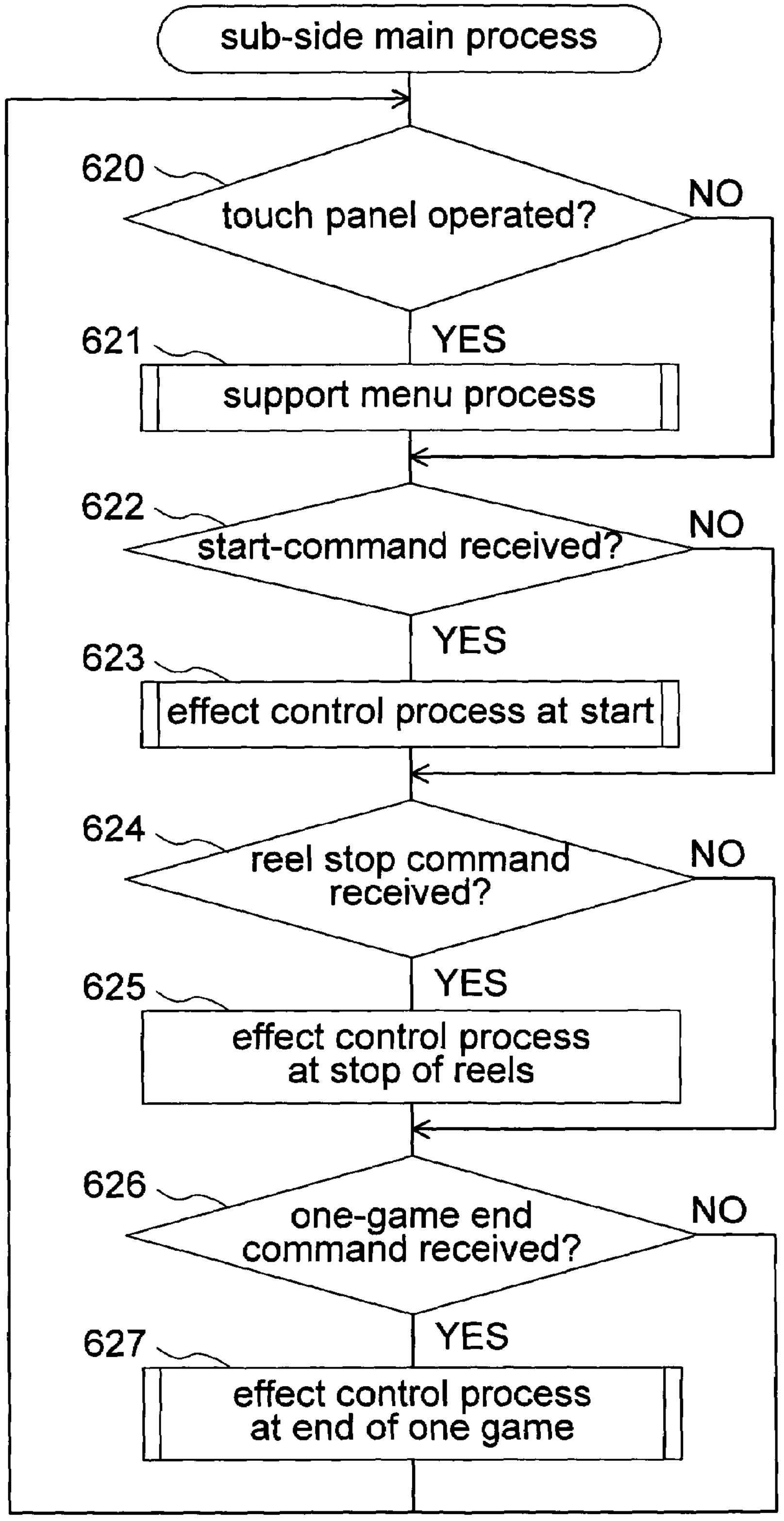
FIG. 25 is a flowchart showing a sub-side main flow.

FIG. 25 shows a flowchart of the main process at the sub-control circuit side. First sub-CPU 203 checks the receiving flag of sub-RAM 205 and determines whether or not there has been an operation input from the touch panel (ST 620). If determined as "YES," a support menu process is executed (ST 621) and a transfer to ST 622 is performed. If determined as "NO," ST 621 is skipped and a transfer to ST 622 is performed. In the support menu process, display and editing of the support menu are carried out in accordance with inputs.

Next, whether or not the start command has been received is determined (ST 622), and if determined as "NO," ST 623 is skipped and a transfer to ST 624 is performed. If determined as "YES," an effect control process for starting is executed (ST 622). With the effect control process for starting, the BR control process is carried out if the current state is the BR state. Details will be given below.

Next, whether or not the reel stop command has been received is determined (ST 624), and if determined as "NO," ST 625 is skipped and a transfer to ST 626 is performed. If determined as "YES," an effect control process for reel stopping is executed (ST 625). With the effect control process for reel stopping, the BR generation lottery process, notification of the order of stopping in the BR state, and effects, which are in accordance with matching of the notified contents and the actual stopping operations, are carried out. Details will be given below.

Next, whether or not the 1 game completion command has been received is determined (ST 626), and if determined as "NO," ST 627 is skipped, a return to the process of ST 620 is performed, and the same processes are repeated. If determined as "YES," an effect control process for the completion of one game is executed (ST 627). With the effect control process for the completion of one game, a notification effect process, or if the current state is the BR state, the process of renewing the number of times of continuation of BR is executed. Details will be given below.

When the process of ST 627 is completed, a return to ST 620 is performed and the same processes are repeated. Thus with the main flowchart of sub-control circuit 201, processes of branching to corresponding effect processes are carried out repeatedly based on game information commands sent from main control circuit 101.

Figure 26:
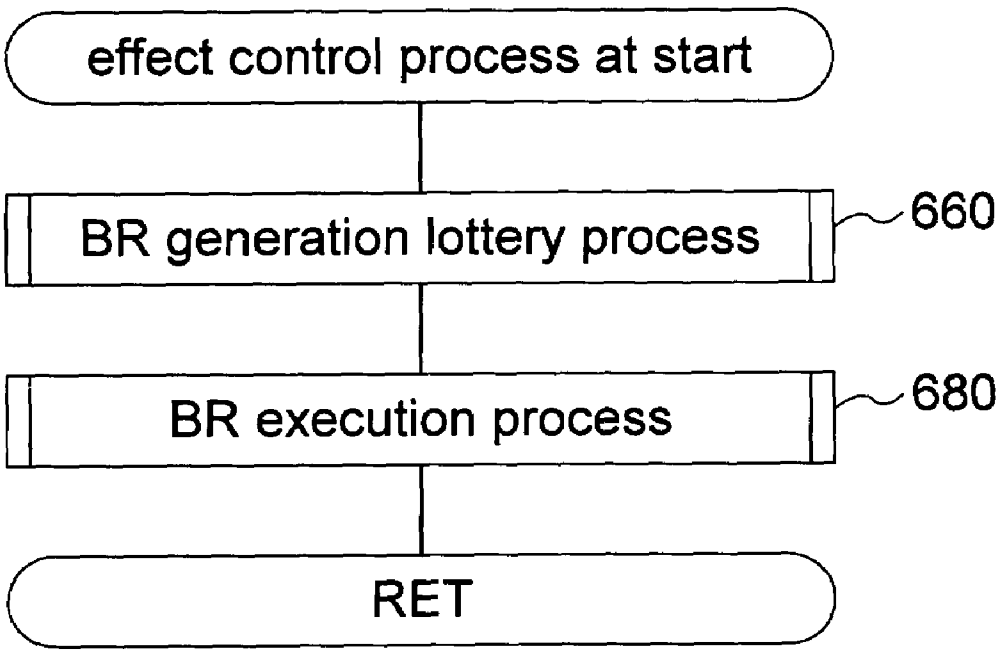
FIG. 26 is a flowchart showing an effect control process that is executed at the starting point.

FIG. 26 shows a flowchart of the effect control process for starting. First, sub-CPU 203 carries out a BR generation lottery process (ST 660). The BR generation lottery process is a process that determines whether or not battle rush, which is a special gaming state, is to be made to occur. Details will be given below. A BR execution process is then carried out (ST 680). With the BR execution process, notification of the stopping order is carried out in the BR state. Details will be given below.

Figure 27:
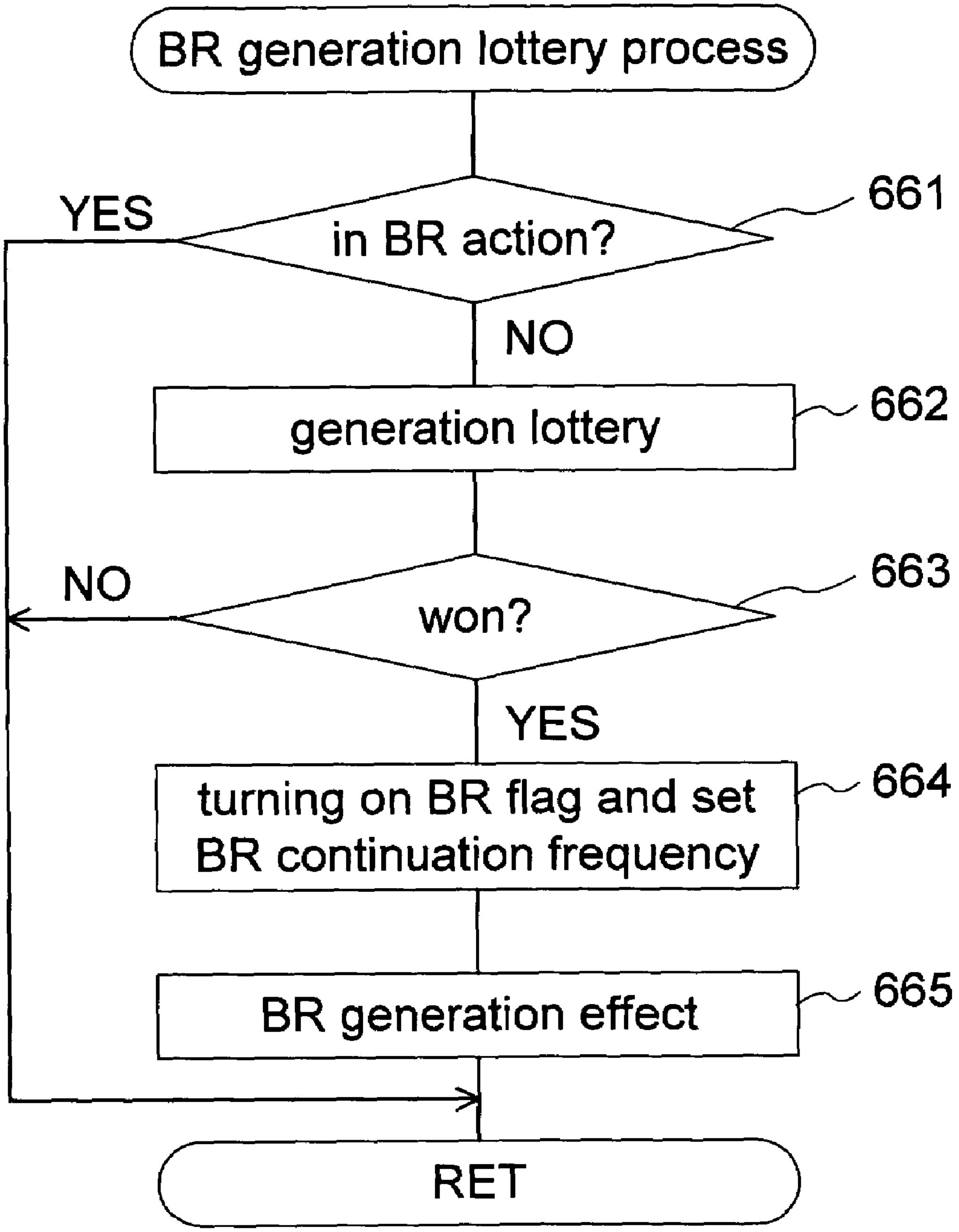
FIG. 27 is a flowchart showing a BR generation lottery process.

FIG. 27 shows a flowchart of the BR generation lottery process. First, sub-CPU 203 checks a BR flag stored in sub-RAM 205 to determine whether or not BR game is currently in progress (ST 661). If determined as "YES," a return to the effect control process for starting is performed as it is. If determined as "NO," the BR generation and BR continuing number lottery table of FIG. 20 is referenced and whether or not a BR continuance number has been won is determined (ST 662, 663). If determined as "NO," a return to the effect control process for starting is performed. If determined as "YES," the BR flag in sub-RM 205 is set to on, the BR continuance number is set to the continuance number that has been won (ST 664), a BR generation effect is carried out (ST 665), and a return to the effect control process for starting is performed.

Figure 28:
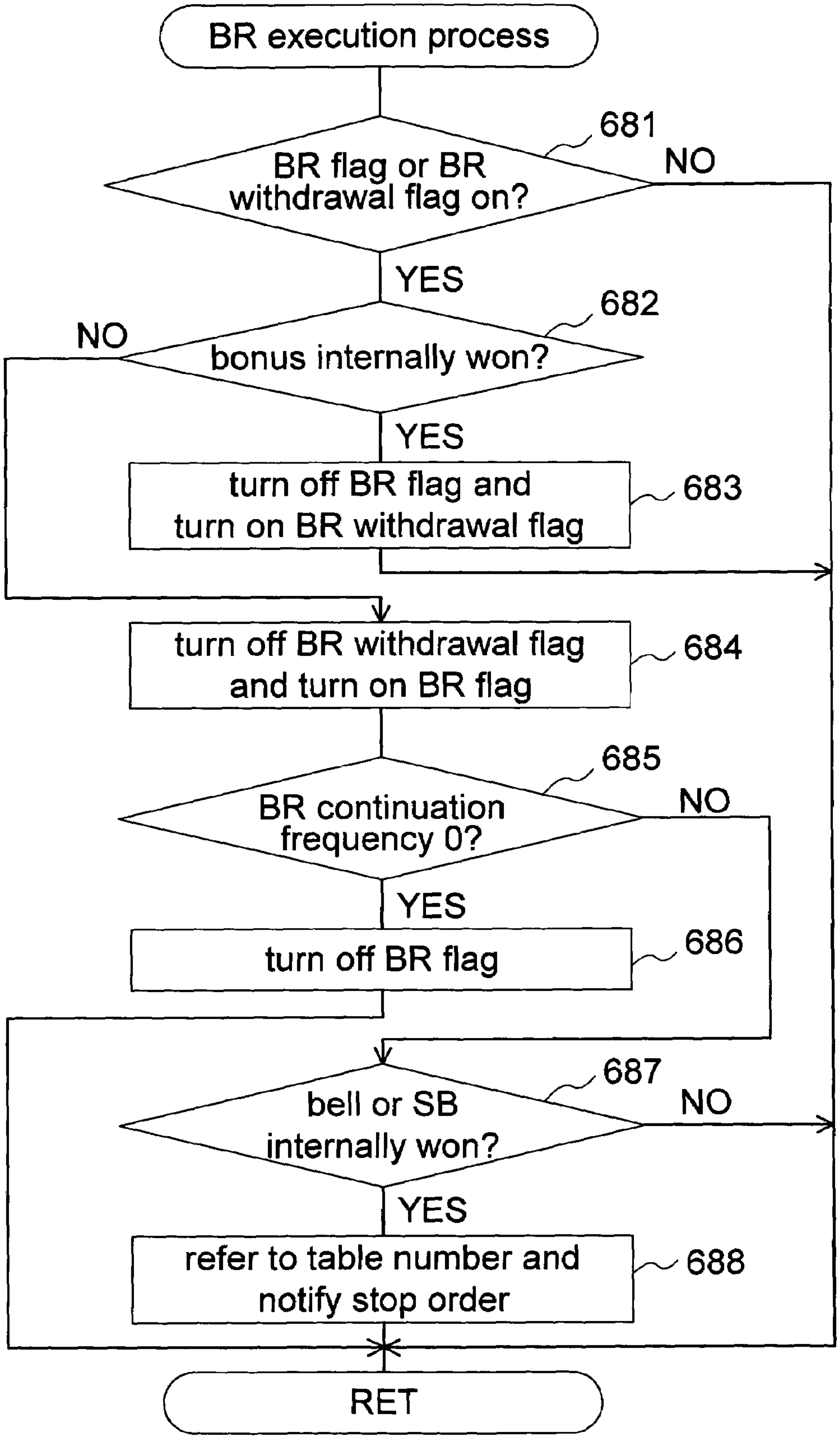
FIG. 28 is a flowchart showing a BR execution process.

FIG. 28 shows a flowchart of the BR execution process. First, sub-CPU 203 checks the BR flag and a BR evacuation flag in sub-RAM 205 to determine whether or not BR game is currently in progress or a bonus has been generated during BR and the BR gaming state is temporarily interrupted (ST 681). If determined as "NO," since this means that the present state is not the BR state, a return to the effect control process for starting is performed as it is. If determined as "YES," the receiving flag in sub-RAM 205 is checked to determine whether or not a winning combination for a bonus game has been won internally (ST 682), and if determined as "YES," the BR is interrupted, the BR flag in sub-RAM 205 is set to off and the BR evacuation flag is set to on in order to finish up the bonus game (ST 683), and a return to the effect control process for starting is performed.

If determined as "NO" in ST 682, then in order to restart BR from the state in which BR is evacuated, the BR evacuation flag in sub-RAM 205 is set to off and the BR flag is set to on (ST 684). The BR continuance number in sub-RAM 205 is then checked to check whether all of the BR continuance number of times of game have been finished and determine whether or not the continuance number has become 0 (ST 685). If determined as "YES," since this means that BR has ended, the BR flag is set to off (ST 686) and a return to the effect control process for starting is performed.

If determined as "NO," since this means that the defined number of times of BR game have not been finished, the receiving flag in sub-RAM 205 is checked to determine whether or not the bell or SB has been won internally in the present game (ST 687). If determined as "YES," the selected stop table category, stored in the receiving flag in sub-RAM 205, is referenced and the appropriate order of stopping is notified (ST 688) and a return to the effect control process for starting is performed. If determined as "NO," a return to the effect control process for starting is performed without notifying anything.

Figure 29:
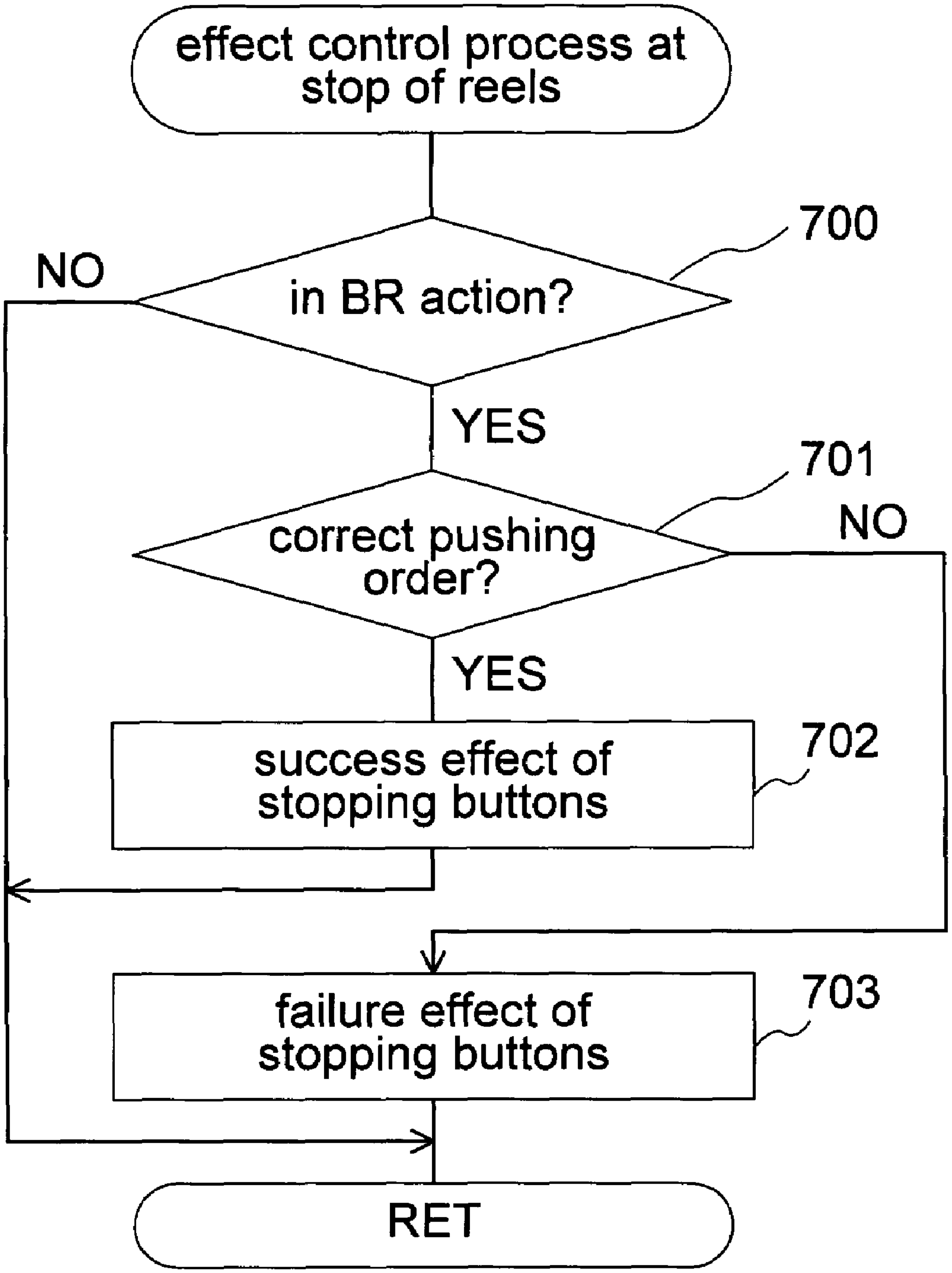
FIG. 29 is a flowchart showing an effect control process that is executed when a reel is stopped.

The effect control process that is carried out when any of the stop buttons 15L, 15C, and 15R is pressed in the BR state will now be described. FIG. 29 shows a flowchart for the effect control process for reel stopping. First, sub-CPU 203 checks the BR flag in sub-RAM 205 to determine whether or not the current state is the BR state (ST 700), and if determined as "NO," a return to the main process at the sub side is performed as it is. If determined as "YES," the stop command of the receiving flag in sub-RAM 205 is checked and the stopping order data and stopped reel data are compared with the used table No. data to determine whether or not the current stopping operation has been performed in the correct order of pushing switches as designated by the stop table (ST 701). If determined as "YES," that the stopping operation was performed in the correct order of pushing switches is displayed (ST 702), while if determined as "NO," that the stopping operation was performed in the wrong order of pushing switches is displayed (ST 703). A return to the main flow for the sub side is then performed.

Figure 30:
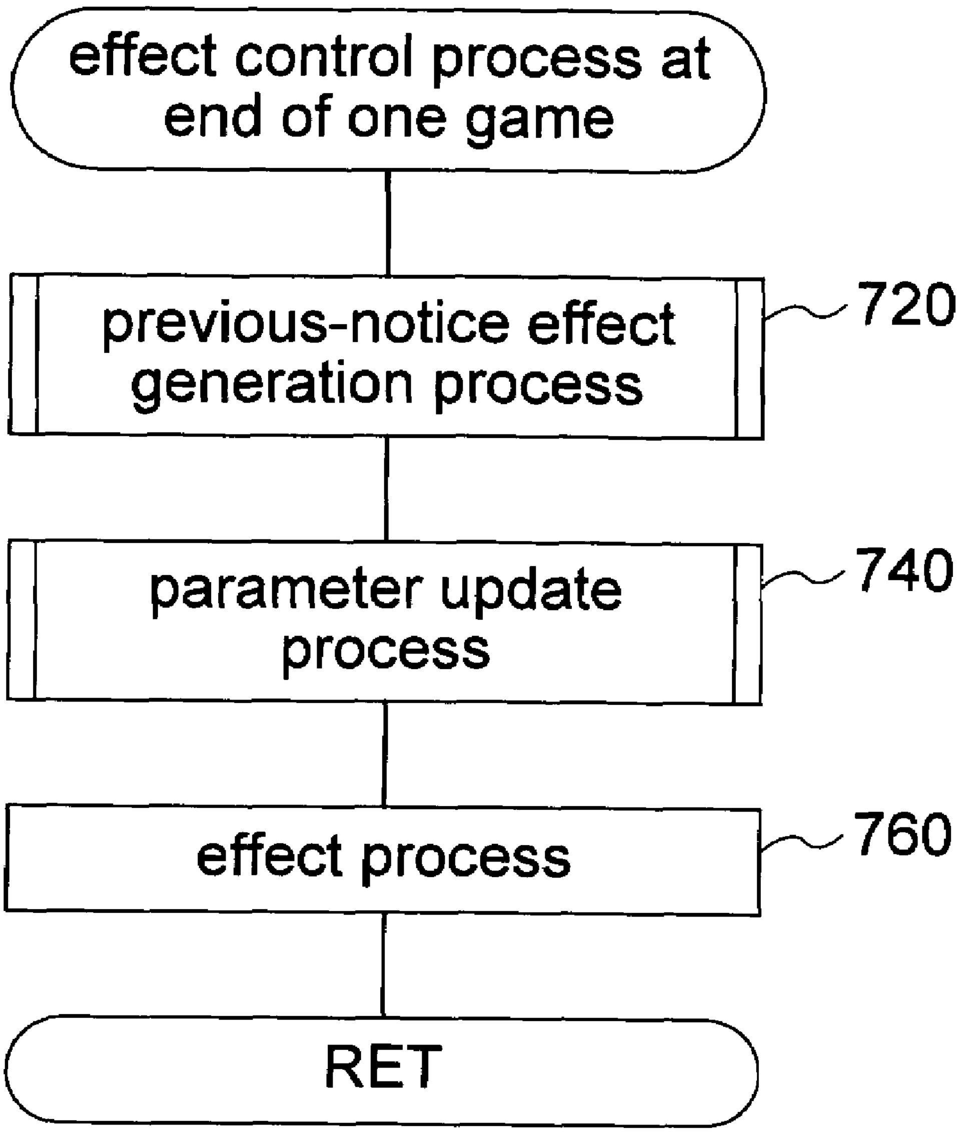
FIG. 30 is a flowchart showing an effect control process that is executed when one game ends.

The effect control process that is carried out after all reels have stopped will now be described. FIG. 30 shows a flowchart for the effect control process for the completion of one game. First, sub-CPU 203 executes a notification effect generation process of determining whether or not a notification effect for an internal winning combination is to be generated (ST 720). Next, a parameter renewal process of renewing the relevant parameters is executed (ST 740) if the current gaming state is the BR state. Then, the effect process is executed (ST 760) if the generation of the notification effect has been determined in the notification effect generation process. A return to the main flow for the sub side is then performed.

Figure 31:
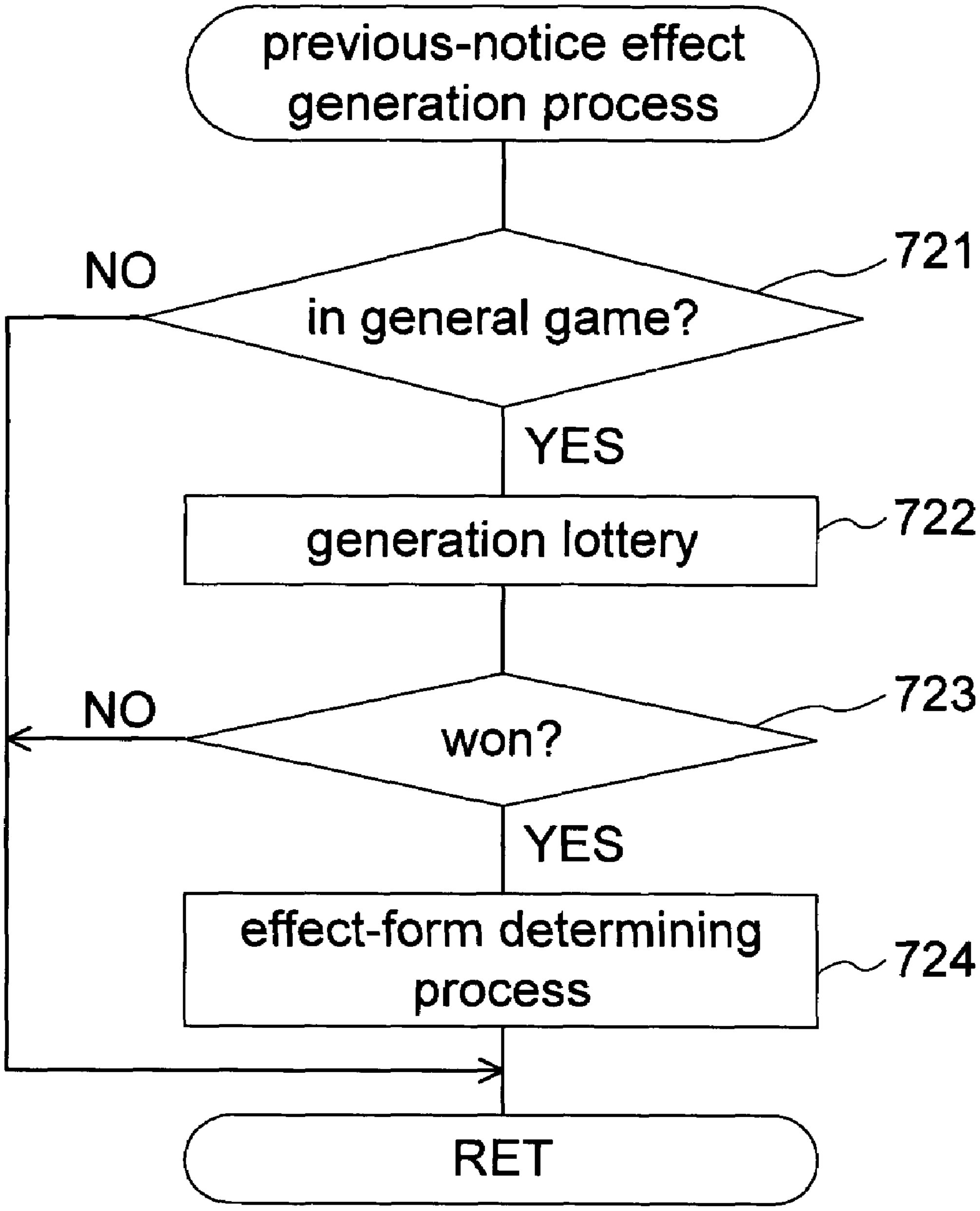
FIG. 31 is a flowchart showing an notification generation process.

FIG. 31 shows a flowchart of the notification effect generation process. First, sub-CPU 203 checks the receiving flag in sub-RAM 205 to determine whether or not the current gaming state is the general gaming state (ST 721), and if determined as "YES," the notification effect generation table of FIG. 19A is referenced to execute a lottery for generating a notification effect (ST 722), whether or not the lottery is won is determined (ST 723), and if determined as "YES," the effect category selection table of FIG. 19B is referenced to execute an effect form determination process to determine the form of the notification effect(ST 724) and then a return to the effect control process for the completion of one game is performed. If determined as "NO," a return to the effect control process for the completion of one game is performed as it is.

Figure 32:
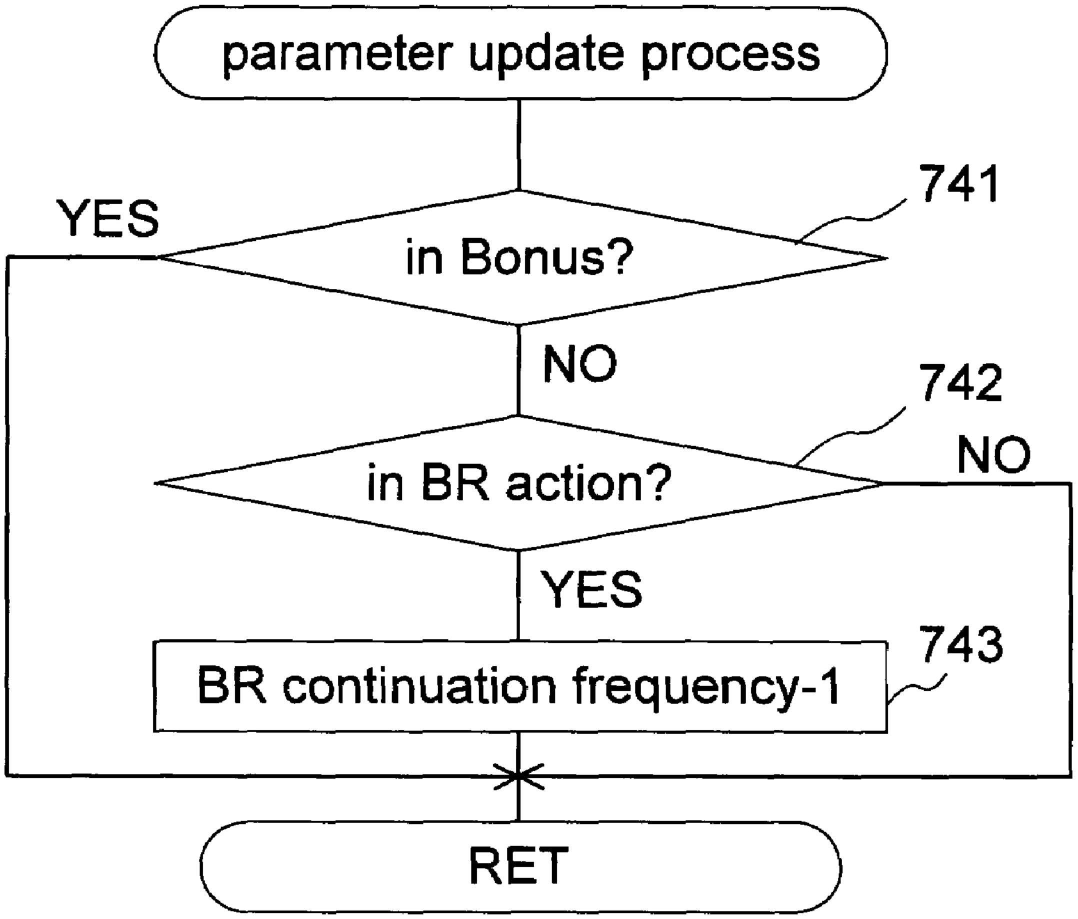
FIG. 32 is a flowchart showing a parameter renewal process.

FIG. 32 shows a flowchart of the parameter renewal process. First, sub-CPU 203 checks the 1 game completion command of the receiving flag stored in sub-RAM 205 to determine whether or not the current gaming state is the bonus game state (ST 741), and if determined as "YES," since the current state cannot be the BR state, a return to the effect control process for the completion of one game is performed as it is. If determined as "NO," the BR flag stored in sub-RAM 205 is checked to determine whether or not the current state is the BR state (ST 742). If determined as "NO," a return to the effect control process for the completion of one game is performed as it is. If determined as "YES," the BR continuance number counter in sub-RAM 205 is decremented (ST 743) and then a return to the effect control process for the completion of one game is performed.

Though the present embodiment is described with the ST period as an advantageous status for the player that is established by achieving the present object, the above-mentioned AT period may be applied instead or as an advantageous status for the player. The winning flag of a specific winning combination may be established or the internal winning probability of a winning combination may be increased.

In addition to the slot machine, the pachi-slot machine, or the like, for example, the above-described embodiment, this invention may be applied in a similar manner to a pachinko gaming machine or an arcade gaming machine equipped with an electrical display device or to a home video game that executes the above-described functions in a simulating manner with a software.

With the present invention, since an effect, which is displayed with the electronic shutter being in the transmissive state, enables the reel symbols at the back side to be visually recognizable at parts at which the effect is not displayed, an effect mode in which reel symbols are mixed with an image effect can be expressed. Also, with an effect displayed with the electronic shutter in the shielding state, since an extraneous background will not be visible and the electronic shutter serves the role of a reflecting plate as well, an even clearer image effect can be expressed.

With the present invention, since it becomes possible to leave just the display regions that are to be displayed to a player in a highlighted manner and shield the other display regions in accordance with stop button operations of the player, information that match changes in the gaming situation can be transmitted effectively without being influenced by the installation positions of the display devices, the brightness of lamps, etc. Also, it becomes possible, in performing stopping operations during ST gaming, to play the ST gaming without movement of the line of sight from the image display unit, on which the stopping order is displayed, to the reels and since the control is carried out in accordance with the stopping operations of a player, the degree of fatigue of the player will be reduced. Also, the switching between the transmissive and shielding states can be performed instantaneously and since the shielded region can be controlled by software, finer effect control is enabled.

With the present invention, since the electronic shutter is activated in the state in which all reels are stopped and since the electronic shutter can thus be controlled to be in the shielding state across the entire display panel without considering the hindering of observation push, which can be a problem in electronic shutter control during rotation of the reels, the execution of large and clear image effects is enabled.

With the present invention, since, when a winning is generated, the reel symbols besides the winning symbols are hidden by an electronic shutter and only the winning combinations are put in visually recognizable states, it is clear at a glance which winning combinations have become established along which pay line, the winning effect can thus be notified effectively to the player, and the game is made more interesting.

By applying the present invention in ST gaming, in which the appropriate stopping order is notified, the winning symbols and the pay line can be notified to the player effectively even during ST gaming, in which the attention of the player is directed just to the stopping order and the concentration regarding which symbols are displayed in stopped form tends to be interrupted.

With the present invention, that an erroneous stopping has been performed during ST gaming can be notified to a player without fail and without the player having to move his/her line of sight to other display devices. Also, since the performing of an erroneous stopping operation is notified not only by means of the control state of the shielding means but also by display of a predetermined image on the effect display part, more definite information transmission is enabled.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A gaming machine comprising:

a plurality of variable display devices configured to variably display various symbols in response to a start operation;

a stop control device configured to perform stop control of the plurality of variable display devices in response to a stop operation via a plurality of stop buttons, each of the stop buttons corresponding to each of the plurality of variable display devices;

a lottery device configured to execute a lottery of a prize-winning combination and selecting one stop order from a plurality of stop orders in a stop order table;

a lottery outcome device configured to enter a selected stop order associated with the prize-winning combination;

a determining device configured to determine whether or not the order of the stop control has been performed in the selected stop order;

a shielding device configured to shield the plurality of variable display devices, the shielding device being disposed in front of the variable display devices; and an attraction display device configured to display an attraction image among predetermined attraction images, the attraction display device being disposed in front of the shielding device;

wherein the shielding device shields other variable display devices other than one variable display device to be firstly stopped, and the attraction display device displays one attraction image, wherein, when the determining device determines that the order of the stop control has been performed in the selected stop order, the shielding device shields other variable display devices other than another display device to be subsequently stopped, and the attraction display device displays another attraction image, and wherein, when the determining device determines that the order of the stop control has not been performed in the selected stop order, the shielding device shields the entirety of the variable display devices, and the attraction display device displays an erroneous attraction image notifying a player that the order of the stop control has not been performed in the selected stop order as selected from the stop order table by the lottery device.

2. The gaming machine according to claim 1, wherein the transmissive state is at least one of a semi-transmissive state and a colored state.

3. The gaming machine according to claim 2, wherein the shielding device comprises an electronic shutter.

4. The gaming machine according to claim 3, wherein the electronic shutter is composed of a liquid crystal film switchable between the transmissive state and the shielding state by way of an applied voltage.

5. The gaming machine according to claim 1, further comprising:

a special games control device configured to provide a special games state under a predetermined condition, wherein the attraction control device controls the shielding device during the special gaming state.

6. The gaming machine according to claim 1, wherein:

the shielding device shields other variable display devices than the variable display devices of the prize-winning combination and the attraction display device displays other images, when the stop control device has stopped all of the variable display devices.

7. The gaming machine according to claim 1, further comprising cold cathode-ray tubes provided at the upper and lower parts at the inner surface side of the panel display device.

8. A gaming machine controller for controlling a gaming machine that includes a plurality of variable display devices and an attraction display device, the gaming machine controller comprising:

(a) a device that displays various symbols on the plurality of variable display devices, in response to a start operation;

(b) a device that performs stop control of the plurality of variable display devices, in response to a stop operation;

(c) a device that executes a lottery of a prize-winning combination and executing one of the entries of a stop order table;

(d) a device that designates a correct order associated with the prize-winning combination, in accordance with the entry from the stop order table;

(e) a device that determines whether the order of the stop control has been performed in the correct order;

(f) a device that shields the plurality of variable display devices; and (g) a device that displays an attraction image among predetermined attraction images on the attraction display device;

wherein, when the device that determines whether the order of the stop control has been performed in the correct order determines that the order of the stop control has been performed in the correct order, other variable display devices other than one variable display device to be firstly stopped are shielded by the device that shields the plurality of variable display devices and a first attraction image is displayed on the device that displays the attraction image in accordance with the designation of the correct order, and subsequently other variable display devices other than one display device to be subsequently stopped is shielded by the device that shields the plurality of variable display devices and a second attraction image is displayed by the device that displays the attraction image in accordance with the determination that the order of the stop control has been performed in the correct order, and wherein, when the determining device determines that the order of the stop control has not been performed in the correct order, the entirety of the variable display devices is shielded by the device that shields the plurality of variable display devices and a third attraction image is displayed on the device that displays an attraction image notifying a player that the order of the stop control has not been performed in the correct order as designated by the device that designates the correct order associated with the prize-winning combination.

9. The gaming machine according to claim 8, further comprising cold cathode-ray tubes provided at the upper and lower parts at the inner surface side of the panel display device.

* * * * *